United States Patent
Murata et al.

(10) Patent No.: US 12,323,693 B2
(45) Date of Patent: Jun. 3, 2025

(54) INFORMATION PROCESSING DEVICE, INFORMATION PROCESSING METHOD, AND PROGRAM WITH USER INTERFACE CONTROL FOR CONNECTION SETTING MODES

(71) Applicant: Sony Group Corporation, Tokyo (JP)

(72) Inventors: Yuki Murata, Tokyo (JP); Ayako Chiba, Tokyo (JP); Haruka Kawata, Kanagawa (JP); Chihiro Fukiage, Kanagawa (JP); Hideki Shiro, Kanagawa (JP); Sho Kobayashi, Tokyo (JP)

(73) Assignee: Sony Group Corporation, Tokyo (JP)

( * ) Notice: Subject to any disclaimer, the term of this patent is extended or adjusted under 35 U.S.C. 154(b) by 205 days.

(21) Appl. No.: 18/246,490

(22) PCT Filed: Sep. 9, 2021

(86) PCT No.: PCT/JP2021/033168
§ 371 (c)(1),
(2) Date: Mar. 23, 2023

(87) PCT Pub. No.: WO2022/070826
PCT Pub. Date: Apr. 7, 2022

(65) Prior Publication Data
US 2023/0345109 A1      Oct. 26, 2023

(30) Foreign Application Priority Data

Sep. 30, 2020   (JP) ................................ 2020-166282

(51) Int. Cl.
H04N 23/62      (2023.01)
H04L 67/06      (2022.01)
H04N 23/66      (2023.01)

(52) U.S. Cl.
CPC ............. H04N 23/62 (2023.01); H04L 67/06 (2013.01); H04N 23/66 (2023.01)

(58) Field of Classification Search
CPC ...... H04N 23/62; H04N 23/66; H04N 21/643; H04N 21/2743; H04N 21/4383; H04N 21/8153; H04L 67/06; G06F 3/0483
See application file for complete search history.

(56) References Cited

U.S. PATENT DOCUMENTS 7,154,538 B1    12/2006  Fukasawa
2005/0044258 A1  2/2005  Nakamura
(Continued)

FOREIGN PATENT DOCUMENTS

JP    2017138777 A    8/2017
JP    2020106874 A    7/2020
WO   2012132132 A1   10/2012

OTHER PUBLICATIONS

International Search Report (PCT/ISA/210), International Application No. PCT/JP2021/033168, dated Nov. 11, 2021.
(Continued)

Primary Examiner — Gevell V Selby
(74) Attorney, Agent, or Firm — Michael Best & Friedrich LLP

(57) ABSTRACT

In an information processing device, processing of a first connection setting mode of detecting a user input for a plurality of setting items provided on a plurality of setting screens in a process of displaying the plurality of setting screens for communication connection setting with an imaging device in a predetermined order, and processing of a second connection setting mode of displaying a corresponding setting screen on the basis of a designation operation for some of the plurality of setting items and detecting a user input to the setting screen are performed.

16 Claims, 22 Drawing Sheets

(56) References Cited

U.S. PATENT DOCUMENTS

| | | | |
|---|---|---|---|
| 2017/0273131 A1* | 9/2017 | Nagahiro | H04N 23/63 |
| 2018/0176550 A1 | 6/2018 | Bamford | |
| 2018/0241939 A1* | 8/2018 | Kawai | H04N 23/60 |
| 2019/0052794 A1* | 2/2019 | Kikuchi | H04N 23/667 |
| 2024/0348915 A1* | 10/2024 | Ito | H04N 23/63 |

OTHER PUBLICATIONS

Sony Corporation: "5. FTP upload :How to use Transfer & Tagging add-on I Sony", Sony Corporation: 5. FTP upload Aug. 10, 2019 (Aug. 10, 2019), XP055746707.

* cited by examiner

A
CAMERA CONNECTION SETTING SCREEN — 365 (5/9)

361 — ×

P5 — 3. Camera settings

363 — Previous  362 — Next

B
CONNECTION DETAIL SETTING SCREEN — 365 (6/9)

364 — ✓

P6 — 3. Camera settings

FTP SETTING

SETTING WITH Bluetooth

SETTING WITHOUT CONNECTING TO Bluetooth

363 — Previous  362 — Next

CONNECTION DETAIL SETTING SCREEN (7/9) — 365
361
× 
3. Camera settings
. . . . . . . . . .
. . . . . . . . . .
1. . . . . . . . . .
HOST NAME
000.00.00.0  ∨
Port
00000  ∨
2. . . . . . . . . .
3. . . . . . . . . .
USER
Previous — 363
Next — 362
P7

B

CONNECTION DETAIL SETTING SCREEN (8/9) — 365
361
×
3. Camera settings
. . . . . . . . . .
. . . . . . . . . .
FTP Connect Method    Wi-Fi
FTP Function          On
Auto Trans When Shot  On
FTP Connect Method    JPEG Only
Previous — 363
Next — 362
P8

INFORMATION PROCESSING DEVICE, INFORMATION PROCESSING METHOD, AND PROGRAM WITH USER INTERFACE CONTROL FOR CONNECTION SETTING MODES

TECHNICAL FIELD

The present technology relates to an information processing device, an information processing method, and a program, and particularly relates to a technology for communication setting between an imaging device and an information processing device.

BACKGROUND ART

There is a use case in which a user who uses an imaging device (also referred to as a "camera") in an event venue, such as a camera operator, a news reporter, or the like entrusted with capturing of an event, transfers an image captured by the imaging device to an information processing device such as a smartphone, a personal computer, a tablet terminal, or the like on site, and selects and edits images on the information processing device.

For example, file transfer protocol (FTP) communication is performed between the imaging device and the information processing device. In that case, it is necessary that settings related to communication between the imaging device and the information processing device are made.

Note that Patent Document 1 discloses a technique related to transfer of setting information.

CITATION LIST

Patent Document

Patent Document 1: JP 2017-138777 A

SUMMARY OF THE INVENTION

Problems to be Solved by the Invention

Meanwhile, in a case where communication connection setting is performed prior to imaging in an event venue, it is desirable to make the setting easy. However, executing various settings related to communication without fail requires a high degree of knowledge and attention from the user.

Furthermore, it may be necessary to change the communication connection setting for various reasons immediately before an event, during an event, or the like. In that case, it is desirable to efficiently change the setting.

Therefore, an object of the present disclosure is to provide a user interface capable of efficiently responding to a setting change while easily executing a setting operation for a plurality of setting items.

Solutions to Problems

An information processing device according to the present technology includes: processing of a first connection setting mode of detecting a user input for a plurality of setting items provided on a plurality of setting screens in a process of displaying the plurality of setting screens for communication connection setting with an imaging device in a predetermined order; and processing of a second connection setting mode of displaying a corresponding setting screen on the basis of a designation operation for some of the plurality of setting items and detecting a user input to the setting screen.

In the first connection setting mode, the setting of the communication connection is completed by sequentially performing the plurality of setting items for communication connection with the imaging device, and communication is enabled. On the other hand, the second connection setting mode is provided to the user on the assumption that some setting items can be directly operated.

In the information processing device described above according to the present technology, it is conceivable to include a connection setting management unit that performs the communication connection setting in accordance with the user input detected by the user interface control unit in the processing of the first connection setting mode, and updates the communication connection setting in accordance with the user input detected in the processing of the second connection setting mode after the processing of the first connection setting mode.

For example, the connection setting management unit first performs communication setting according to the processing of the first connection setting mode. Thereafter, in a case where some of the setting items are changed in the second connection setting mode, the communication setting is updated.

In the information processing device described above according to the present technology, it is conceivable that the user interface control unit displays a connection setting start screen on which both a start operation of the first connection setting mode and a designation operation of a setting item in the second connection setting mode are enabled.

That is, a connection setting start operation in the first connection setting mode and a setting item designation operation in the second connection setting mode can be performed on the same screen.

In the information processing device described above according to the present technology, it is conceivable that in the first connection setting mode, the setting screens related to the plurality of setting items including information processing device-side connection setting and imaging device-side connection setting are sequentially displayed, and in the second connection setting mode, at least a setting item of the information processing device-side connection setting can be designated.

In the first connection setting mode, necessary connection settings including communication connection settings on the information processing device side and the imaging device side are enabled to be executed in the course of a series of image transitions. In the second connection setting mode, the connection setting on the information processing device side can be selected and executed.

In the information processing device described above according to the present technology, it is conceivable that in the first connection setting mode, the setting screens related to the plurality of setting items including information processing device-side connection setting and imaging device-side connection setting are sequentially displayed, and in the second connection setting mode, at least a setting item of the imaging device-side connection setting can be designated.

The connection setting necessary in the first connection setting mode can be executed in the course of a series of image transitions, and the connection setting on the imaging device side can be selected and executed in the second connection setting mode.

In the information processing device described above according to the present technology, it is conceivable that in the first connection setting mode, the setting screens related to the plurality of setting items including information processing device-side connection setting, imaging device-side connection setting, and connection detail setting are sequentially displayed, and in the second connection setting mode, at least a setting item of the connection detail setting can be designated.

The connection setting necessary in the first connection setting mode can be executed in the course of a series of image transitions, and the detailed setting of the connection can be selected and executed in the second connection setting mode.

In the information processing device described above according to the present technology, it is conceivable that in the first connection setting mode, the setting screens related to the plurality of setting items including communication connection on/off setting, information processing device-side connection setting, and imaging device-side connection setting are sequentially displayed, and in the second connection setting mode, at least a setting item of the communication connection on/off setting can be designated.

The connection setting necessary in the first connection setting mode can be executed in the course of a series of image transitions, and the communication connection on/off setting can be selected and executed in the second connection setting mode.

In the information processing device described above according to the present technology, it is conceivable that in the first connection setting mode, the setting screens related to the plurality of setting items including communication connection on/off setting, information processing device-side connection setting, and imaging device-side connection setting are sequentially displayed, and in the second connection setting mode, in a case where a setting item of the communication connection on/off setting is turned on, the information processing device-side connection setting and the imaging device-side connection setting can be designated.

In the second connection setting mode, the communication connection on/off setting, the information processing device-side connection setting, and the imaging device-side connection setting can be individually designated, but the information processing device-side connection setting and the imaging device-side connection setting can be operated only when the communication connection sound is turned on.

In the information processing device described above according to the present technology, it is conceivable that in the first connection setting mode, the setting screens related to the plurality of setting items including information processing device-side connection settings are sequentially displayed, in the second connection setting mode, the information processing device-side connection setting can be designated, and a setting screen for the information processing device-side connection setting in the first connection setting mode and a setting screen for the information processing device-side connection setting in the second connection setting mode are screens indicating setting contents in a same mode.

The information processing device-side connection setting can be performed in both the first connection setting mode and the second connection setting mode, and screens indicating setting contents in the same mode are displayed.

In the information processing device described above according to the present technology, it is conceivable that in the first connection setting mode, the setting screens related to the plurality of setting items including imaging device-side connection settings are sequentially displayed, in the second connection setting mode, the imaging device-side connection setting can be designated, and a setting screen for the imaging device-side connection setting in the first connection setting mode and a setting screen for the imaging device-side connection setting in the second connection setting mode are screens indicating setting contents in a same mode.

The imaging device-side connection setting can be performed in both the first connection setting mode and the second connection setting mode, and screens indicating setting contents in the same mode are displayed.

In the information processing device described above according to the present technology, it is conceivable that when the communication connection setting in the first connection setting mode is completed, the user interface control unit displays a screen on which an operation for giving an instruction on execution of a test of communication connection can be performed.

When a series of communication connection settings is completed in the first connection setting mode, for example, an interface for proceeding to a connection test of actual communication is provided on a screen indicating completion.

In the information processing device described above according to the present technology, it is conceivable that the connection setting start screen is operable to give an instruction on execution of a test of communication connection.

That is, on the connection setting start screen, it is possible to operate the start of the first connection setting mode, designation of the setting item of the second connection setting mode, and execution of the connection test.

In the information processing device described above according to the present technology, it is conceivable to include a communication control unit that controls communication with the imaging device on the basis of the communication connection setting managed by the connection setting management unit, in which the communication control unit causes image transfer from the imaging device to be performed at a time of a test of communication connection, and the user interface control unit performs processing of displaying a transfer image.

That is, the actual image transfer is performed also at the time of test of the communication connection so that the user can confirm the transfer status.

In the information processing device described above according to the present technology, it is conceivable that the user interface control unit performs processing of causing a display indicating an error content to be executed in a case where an error occurs in the test of the communication connection.

The user can confirm an error situation by the test of the communication connection.

In the information processing device described above according to the present technology, it is conceivable that the communication connection setting with the imaging device is communication connection setting of wired communication or short-range wireless communication.

The wired communication is, for example, communication by a transmission line such as a universal serial bus (USB) cable or the like. The short-range wireless communication refers to wireless communication with a short communication distance, and specifically corresponds to communication of standards such as Bluetooth (registered trademark), Wireless Fidelity (Wi-Fi: registered trademark), and near field communication (NFC: registered trademark), infrared communication, and the like.

In an information processing method of the present technology, an information processing device performs: processing of a first connection setting mode of detecting a user input for a plurality of setting items provided on a plurality of setting screens in a process of displaying the plurality of setting screens for communication connection setting with an imaging device in a predetermined order; and processing of a second connection setting mode of displaying a corresponding setting screen on the basis of a designation operation for some of the plurality of setting items and detecting a user input to the setting screen.

A program according to the present technology is a program that causes an information processing device to execute processing corresponding to such an information processing method.

As a result, a plurality of modes regarding communication connection setting is provided to the user.

BRIEF DESCRIPTION OF DRAWINGS

FIG. 16 is an explanatory diagram of a setting screen according to the embodiment.

MODE FOR CARRYING OUT THE INVENTION

Figure 1:
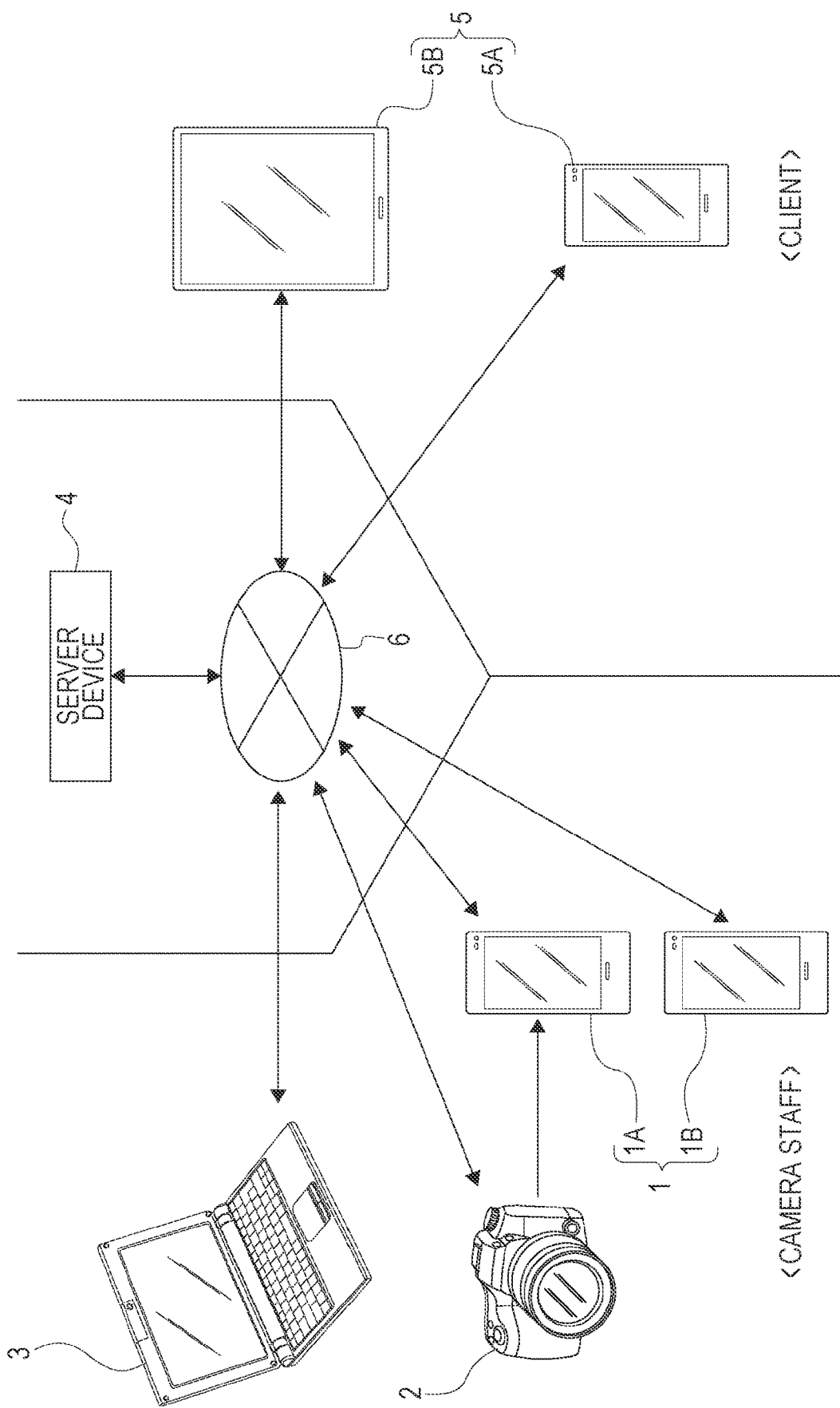
FIG. 1 is an explanatory diagram of a system configuration according to an embodiment of the present technology.

Hereinafter, embodiments will be described in the following order.

<1. System Configuration and Work Procedure for Image Collection Providing Service>
<2. Configuration of Information Processing Device>
<3. Presetting Processing>
<4. Communication Connection Setting>
<5. Conclusion and Modifications>

1. System Configuration and Work Procedure for Image Collection Providing Service In the embodiment, for example, a case is assumed that a camera operator performs still image capturing (photographing) at an event such as a wedding or the like, generates content as an image collection by captured images, and provides the content to a client for a fee or free of charge.

Note that not only still images but also moving images with audio or moving images without audio may be captured, and an image collection including these moving images or an image collection by a plurality of moving images may be generated.

For the sake of description, camera operators and assistants thereof are collectively referred to as camera staff.

In addition, the client is a generic term for not only the orderer but also users who can browse the image collection provided. For example, related parties such as the bride and groom, relatives, friends, and the like are collectively referred to as clients.

The image collection broadly refers to content in which images (still images and moving images) are collected such as a photo album, and the provision form thereof is not limited. However, in the present embodiment, as an example, an image collection as a web gallery and an image collection of actual delivery can be provided.

Here, the image collection of web gallery is, for example, an electronic image collection in which photos of an event can be quickly browsed on a website after the end of the event such as a wedding or the like.

Note that, in the description, a website is used as an example, but this is merely an example, and a provision form in which a content file as an image collection can be transmitted to a terminal device of a client by using, for example, an e-mail, an electronic message, an SNS, or the like may be adopted.

In addition, the image collection of the actual delivery is, for example, an image collection of an event that the camera staff officially creates as a photo album and provides to the client at a later date. The image data captured in the event may be edited to form an electronic image collection as image album content, slide show content, or the like, or for example, an image collection by a paper medium may be created. The electronic image collection may be provided by download, streaming, or the like, or may be provided by being stored in a portable storage medium such as a disk-shaped storage medium, a card-shaped storage medium, a tape-shaped storage medium, or a flash memory medium.

In the present embodiment, as an image collection of web gallery, an image collection that can be quickly browsed by a client can be generated before an image collection of the actual delivery. In addition, the image collection of web gallery is not merely a simple arrangement of a large number of captured images, but is selected images and can have a quality that the viewer can enjoy.

On the other hand, the image collection of the actual delivery is regarded as being able to be created by the camera staff taking time to perform more creative editing.

FIG. 1 illustrates terminal devices 1A and 1B, an imaging device 2, a personal computer 3, a server device 4, terminal devices 5A and 5B, and a network 6.

Note that the terminal devices 1A and 1B indicate terminal devices used by the camera staff, and these terminal devices are collectively referred to as a staff terminal 1 for distinction in description.

The terminal devices 5A and 5B indicate terminal devices used by the users as the above-described clients, and these terminal devices are collectively referred to as a client terminal 5 for the sake of description.

Here, as the staff terminal 1 and the client terminal 5, a portable terminal device such as a smartphone, a tablet device, and the like is exemplified.

For example, the terminal device 1A is assumed to be a smartphone used by a camera operator, and the terminal device 1B is assumed to be a smartphone or the like used by an assistant.

In addition, the terminal device 5A is assumed to be a smartphone used by the bride, and the terminal device 5B is assumed to be a tablet device or the like used by a friend in the venue.

The staff terminal 1 and the client terminal 5 may be so-called information processing devices, and as specific examples thereof, various examples such as a personal computer device, a mobile phone device, a game device, an audio device, a video device, a communication device, a television device, and the like are assumed. That is, the staff terminal 1 or the client terminal 5 of the present disclosure can be an information processing device capable of performing information processing calculation, for example, a device incorporating a microcomputer.

However, since use in an event venue or the like is assumed, a portable terminal such as a smartphone, a tablet device, or the like is preferable.

As the imaging device 2, various imaging devices as a video camera or a still camera are assumed. The imaging device 2 illustrated in the drawing is assumed to be a camera used by a camera operator in a venue of a wedding.

The imaging device 2 and the staff terminal 1 (for example, the terminal device 1A) can perform data communication. For example, data communication is performed by file transfer protocol (FTP) communication.

Specifically, it is conceivable that the terminal device 1A serves as an FTP server, and image files (including image data and metadata) captured by the imaging device 2 are sequentially or collectively uploaded by FTP communication.

Therefore, it is assumed that FTP settings for performing data transfer to the terminal device 1A are set in the imaging device 2.

The content of the FTP setting information includes a host name, a save destination path, a user name, a password, a connection type, and the like of the FTP server.

However, the imaging device 2 and the terminal device 1A are not necessarily limited to the FTP, and other protocols may be used.

In addition, it is sufficient that an image or metadata can be transferred between the imaging device 2 and the terminal device 1A by any communication method. For example, mutual information communication may be performed by short-range wireless communication such as Bluetooth (registered trademark), wireless fidelity (WI-FI: registered trademark), near field communication (NFC: registered trademark), or the like, infrared communication, or the like.

Furthermore, the imaging device 2 and the terminal device 1A may be communicable with each other by wired connection communication such as a wired LAN or the like.

The personal computer 3 is exemplified as an information processing device used by a camera staff to create an image collection content of the actual delivery, for example.

The personal computer 3 is used for work of acquiring data related to images of the event from the server device 4 and creating an image collection content of the actual delivery by an image editing application or the like.

The server device 4 provides and manages various types of information in order for the camera staff to create a web gallery and an image collection of the actual delivery.

For example, the staff terminal 1 has installed an application program for the image collection providing service, and performs processing to be described later according to the application program. Correspondingly, the server device 4 manages data related to the event, generates a web gallery, and the like.

For example, the staff terminal 1 and the server device 4 are always connected during activation of the application program described above, and event data is synchronized. Examples of the event data will be described later, and include image data captured in the event, data used for generating a web gallery, and the like.

In the present disclosure, "synchronization" means that at least a part of the content of the event data stored in the staff terminal 1 and the content of the event data stored in the server device 4 are maintained so as to have the same data content. Examples of the data to be synchronized include image data, rating information indicating an evaluation given to each image by a camera staff, selection information indicating selection as an image to be recorded in an image collection such as a web gallery or the like, image editing information, and the like.

As the network 6, for example, the Internet, a home network, a local area network (LAN), a satellite communication network, and various other networks are assumed.

The staff terminal 1 can upload image data and the like to the server device 4 via the network 6 and can transmit information for synchronization.

The client terminal 5 can access a web page provided by the server device 4 via the network 6 and browse the web gallery.

The personal computer 3 can acquire an image file for creating the image collection content of the actual delivery from the server device 4 via the network 6.

A schematic procedure of image collection provision implemented by the system as illustrated in FIG. 1 will be described with reference to FIG. 2. This is a work procedure in the staff terminal 1 based on an operation of a camera staff as a service provider.

Presetting is performed as step S1. For example, the camera staff performs communication setting between the staff terminal 1 and the imaging device 2, event setting, image retouch setting, and the like. This presetting is performed before the start of the wedding.

In step S2, imaging/transfer/automatic editing during the wedding is performed.

The image file captured by the camera operator with the imaging device 2 is sequentially transferred to the staff terminal 1 (for example, the terminal device 1A).

The staff terminal 1 takes in the image file, transfers the image file and the like to the server device 4, automatically edits the images according to the presetting, and the like.

Step S3 illustrates a work that can be performed on the day after the end of the wedding or the like.

The camera staff performs selection operation using the staff terminal 1. The selection includes selection of images to be posted on the web gallery, selection of cover images and highlight images, further editing of images, and the like.

Figure 3:
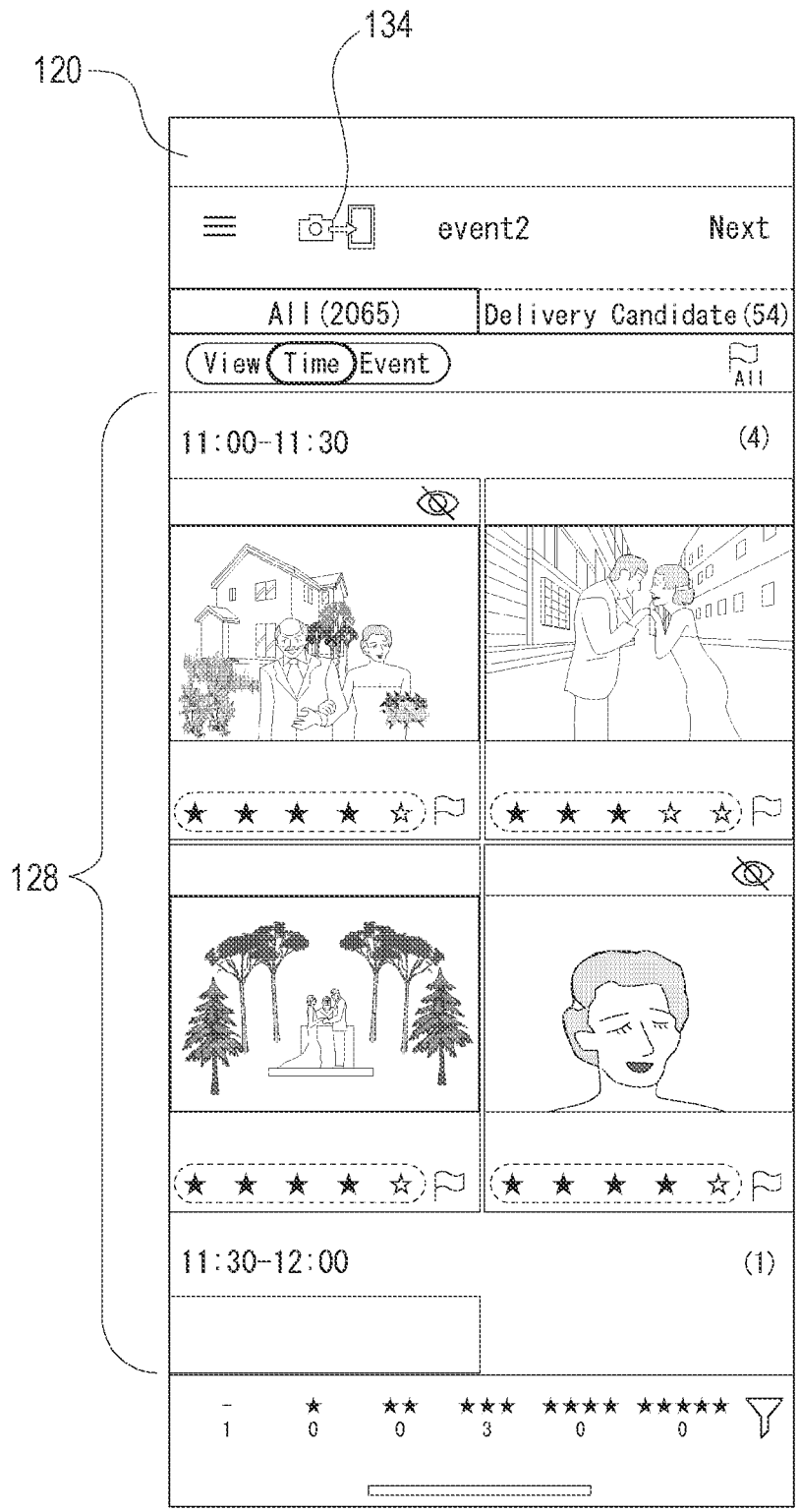
FIG. 3 is an explanatory diagram of an event screen according to the embodiment.

For example, FIG. 3 illustrates an example of an event screen 120 displayed on the staff terminal 1. The staff terminal 1 displays a list of images transferred from the imaging device 2 in an image area 128 of the event screen 120.

Although not described in detail, the event screen 120 enables rating setting for each image, selection of images to be adopted for an image collection, filtering of images, and the like.

Figure 4:
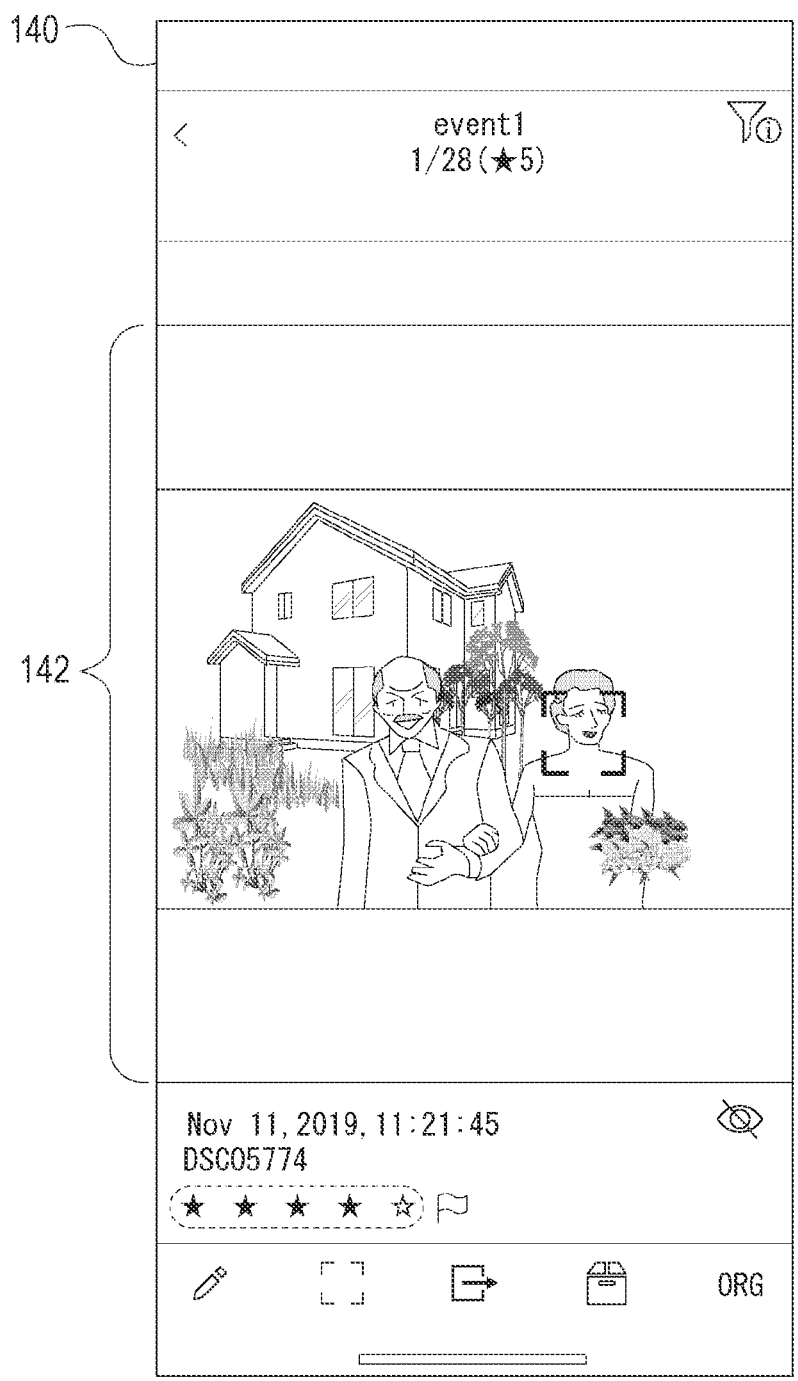
FIG. 4 is an explanatory diagram of a one-picture display screen according to the embodiment.

In addition, FIG. 4 illustrates a one-picture display screen 140. When the user taps a certain image on the event screen 120, the image can be enlarged and viewed in the one-picture display area 142 of the one-picture display screen 140 as illustrated in FIG. 4.

Rating setting and selection can be performed on the one-picture display screen 140, and image editing and the like can be performed.

For example, the camera staff can perform selection, editing, or the like of images on the event screen 120 or the one-picture display screen 140 as described above. Furthermore, images to be used as a front cover, images to be highlighted, and the like can be set among the selection target images.

The image data and Information such as selection, editing, or the like of the images are synchronously managed in the staff terminal 1 and the server device 4 as event data related to one event such as a wedding or the like, and is used for creation of an image collection for subsequent web gallery and actual delivery.

Figure 2:
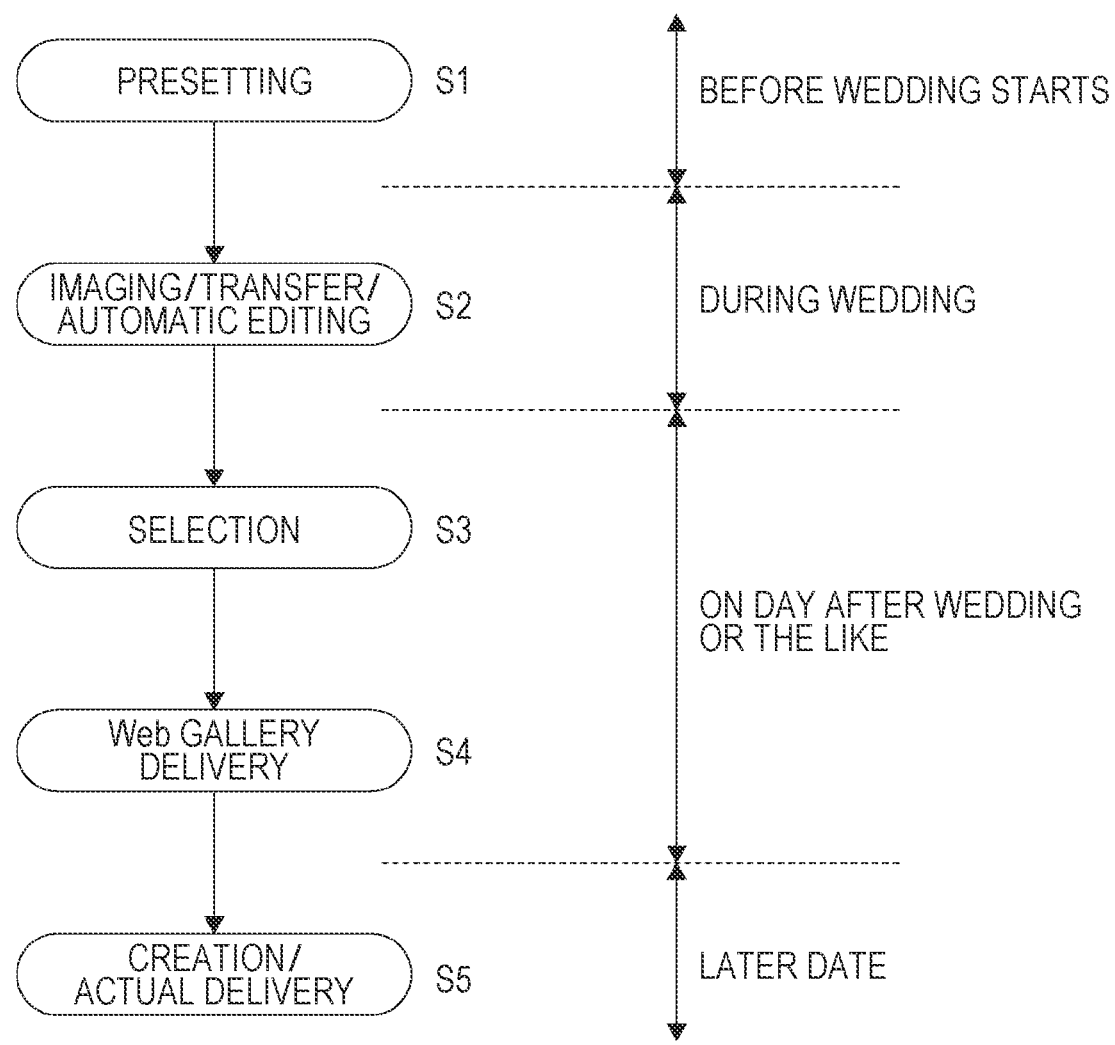
FIG. 2 is an explanatory diagram of a work procedure for providing a service according to the embodiment.

In step S3 of FIG. 2, the processing on the images transferred from the imaging device 2 can be performed on the staff terminal 1 as described above. The staff terminal 1 performs update processing or the like of event data according to an operation of the camera staff. Processing for synchronizing the event data with the server device 4 side is also sequentially performed.

Note that the selection in step S3 may be performed while the wedding or the like is in progress.

In step S4, web gallery delivery processing is performed. In the server device 4, a web gallery is created on the basis of the event data. The server device 4 generates page information in a hypertext markup language (HTML) format or an extensible markup language (XML) format as the web gallery data.

The camera staff accesses such a web page on the staff terminal 1, confirms the content of the web gallery, and then performs an operation to make the content browsable to the client. Therefore, for example, on the day after the end of the wedding or the like, the client can browse the web gallery that is an image collection of the wedding.

Figure 5:
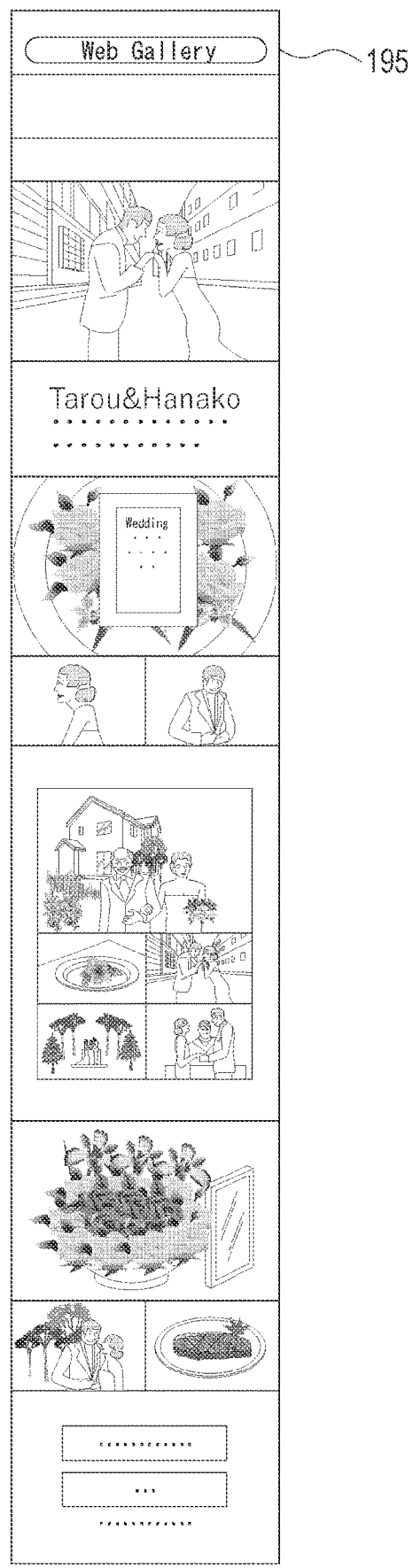
FIG. 5 is an explanatory diagram of a web gallery according to the embodiment.

FIG. 5 illustrates an example of a web gallery 195. This is an example in which it is assumed that the client terminal 5 is a smartphone or the like, and images of a wedding can be browsed by scrolling in the vertical direction.

Step S5 in FIG. 2 illustrates creation of an image collection of the actual delivery and actual delivery processing.

The camera staff creates the image collection content of the actual delivery at a later date using, for example, the personal computer 3 and provides the image collection content to the client.

As a result, the client can receive the image collection content as the actual delivery.

<2. Configuration of Information Processing Device>

Figure 6:
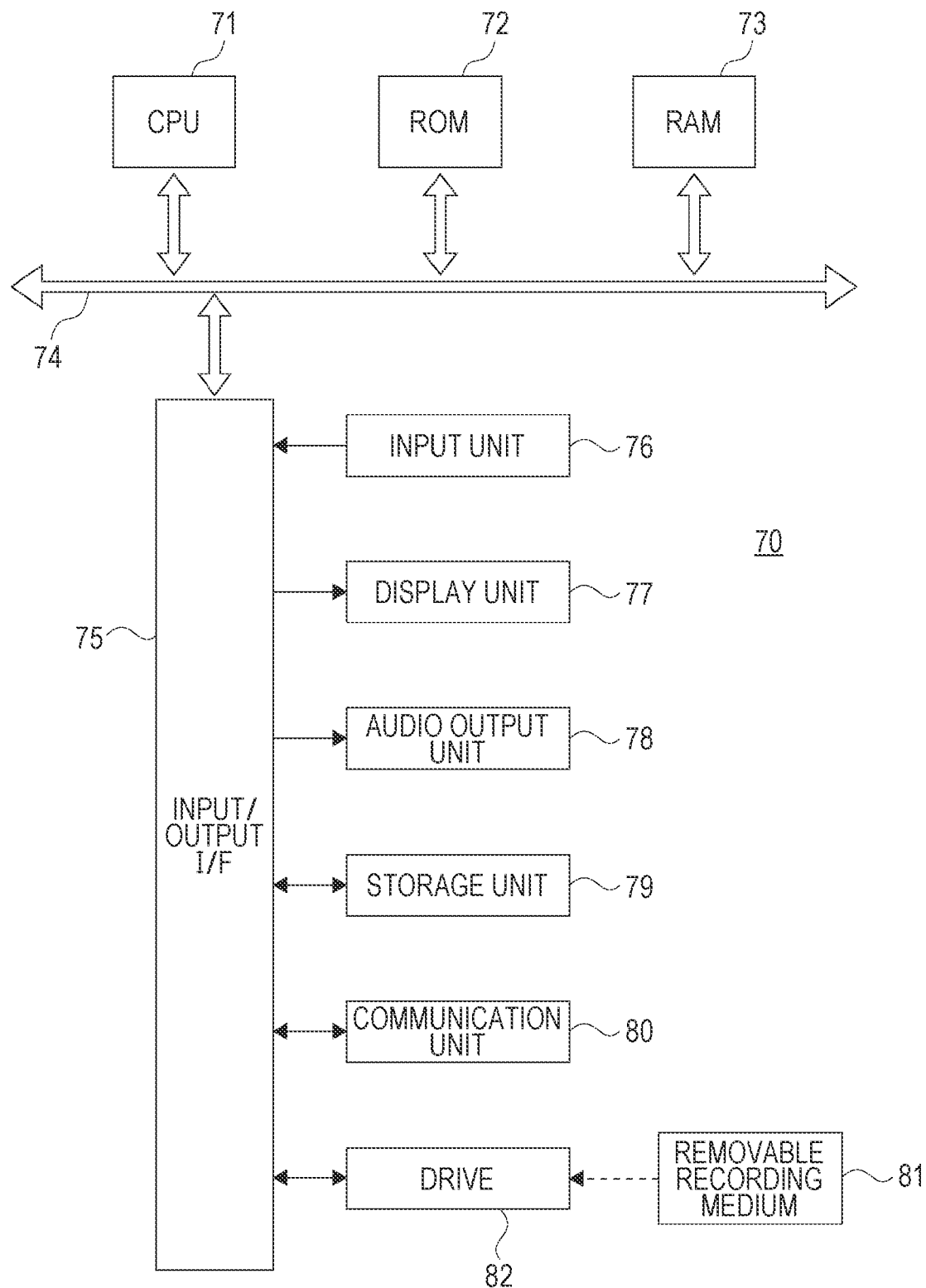
FIG. 6 is a block diagram of a configuration of a terminal device and a server device according to the embodiment.

FIG. 6 illustrates a configuration example of an information processing device 70 that can be configured as the staff terminal 1, the client terminal 5, the server device 4, or the personal computer 3. The staff terminal 1, the personal computer 3, or the server device 4 can execute processing and communication in the system of the present embodiment by having the following configuration of the information processing device 70. In addition, the imaging device 2 can also execute communication with the staff terminal 1 described later by including the following configuration of the information processing device 70.

A central processing unit (CPU) 71 of the information processing device 70 executes various types of processing in accordance with a program stored in a read only memory (ROM) 72 or a program loaded from a storage unit 79 into a random access memory (RAM) 73. The RAM 73 also appropriately stores data and the like necessary for the CPU 71 to execute various processes.

The CPU 71, the ROM 72, and the RAM 73 are connected to one another via a bus 74. An input/output interface 75 is also connected to the bus 74.

An input unit 76 including an operator and an operation device is connected to the input/output interface 75.

For example, as the input unit 76, various operators and operation devices such as a keyboard, a mouse, a key, a dial, a touch panel, a touch pad, a remote controller, and the like are assumed.

An operation of the user is detected by the input unit 76, and a signal corresponding to the input operation is interpreted by the CPU 71.

In addition, a display unit 77 including a liquid crystal display (LCD), an organic electro-luminescence (EL) display, or the like, and an audio output unit 78 including a speaker or the like are integrally or separately connected to the input/output interface 75.

The display unit 77 is a display unit that performs various displays, and includes, for example, a display device provided in a housing of the information processing device 70, a separate display device connected to the information processing device 70, or the like.

The display unit 77 executes display of an image for various types of image processing, an image to be processed, and the like on a display screen on the basis of an instruction from the CPU 71. In addition, the display unit 77 displays various operation menus, icons, messages, and the like, that is, displays as a graphical user interface (GUI) on the basis of an instruction from the CPU 71.

The input/output interface 75 may be connected with the storage unit 79 including a hard disk, a solid-state memory, or the like, and a communication unit 80 that performs communication using various communication methods.

The communication unit 80 performs communication processing via a transmission path such as the Internet, wired/wireless communication with various devices, bus communication, and the like.

In a case where the information processing device 70 is assumed as the staff terminal 1, the communication unit 80 has a function of FTP communication with the imaging device 2 and a function of performing communication with the server device 4 via the network 6.

The communication unit 80 may have a function of performing communication by short-range wireless communication such as Bluetooth, Wi-Fi, NFC, or the like, infrared communication, wired connection communication, or the like. In addition, the communication unit 80 may have a function of performing communication through a communication line for mobile phones such as long term evolution (LTE) or the like.

In a case where the information processing device 70 is assumed as the server device 4 or the personal computer 3, the communication unit 80 has at least a function of performing communication via the network 6.

A drive 82 is also connected to the input/output interface 75 as necessary, and a removable recording medium 81 such as a magnetic disk, an optical disk, a magneto-optical disk, a semiconductor memory, or the like is appropriately mounted.

By the drive 82, a data file such as an image file, various computer programs, and the like can be read from the removable recording medium 81. The read data file is stored in the storage unit 79, and images and sounds included in the data file are output by the display unit 77 and the audio output unit 78. In addition, the computer program and the like read from the removable recording medium 81 are installed in the storage unit 79 as necessary.

In the information processing device 70, for example, software for processing of the present disclosure can be installed via network communication by the communication unit 80 or the removable recording medium 81. Alternatively, the software may be stored in advance in the ROM 72, the storage unit 79, or the like.

Figure 7:
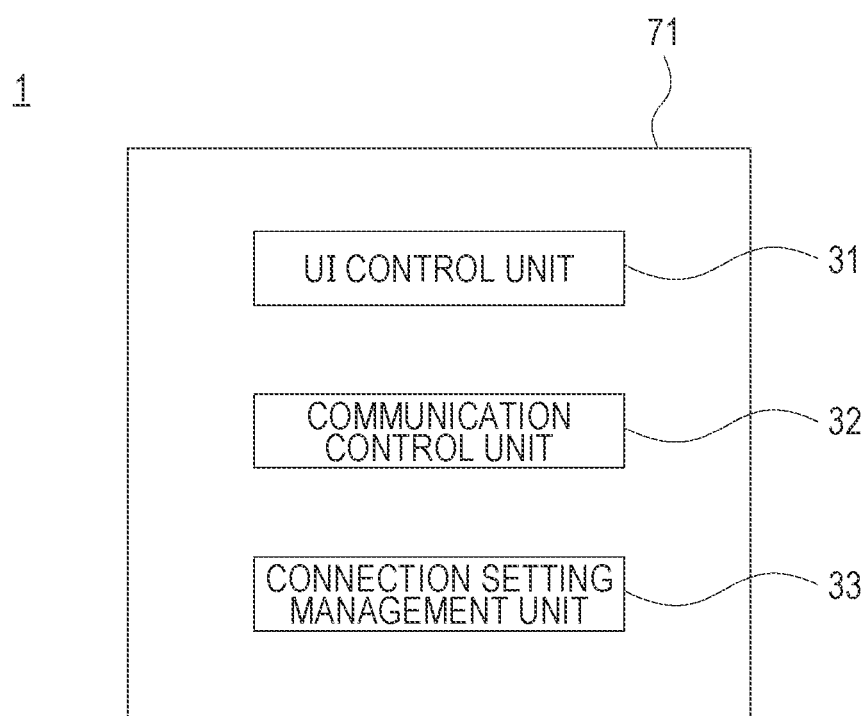
FIG. 7 is an explanatory diagram of a functional configuration of the terminal device according to the embodiment.

In a case where the staff terminal 1 is assumed as the information processing device 70, in the information processing device 70, a functional configuration as illustrated in FIG. 7 is constructed in the CPU 71 by software (application program).

FIG. 7 illustrates a user interface (UI) control unit 31, a communication control unit 32, and a connection setting management unit 33 as functions provided for the communication connection setting with the imaging device 2 in the information processing device 70 serving as the staff terminal 1.

The UI control unit 31 performs processing of providing an operation input environment to the user by performing output such as display output, audio output, or the like to the user, for example. For example, the UI control unit 31 performs processing such as control of screen display of the event screen 120 and the like described above, detection of an operation input of the user, and the like.

In the case of the present embodiment, the UI control unit 31 performs processing of an entry mode (first connection setting mode) for detecting a user input for a plurality of setting items provided on a plurality of setting screens in a process of displaying a plurality of setting screens for communication connection setting with the imaging device 2 in a predetermined order, as a user interface related to communication connection setting.

Furthermore, the UI control unit 31 displays the corresponding setting screen on the basis of a designation operation for some of the plurality of setting items, and performs processing of an advance mode (second connection setting mode) for detecting a user input to the setting screen.

The communication control unit 32 is a function of controlling a communication operation by the communication unit 80.

The communication control unit 32 performs processing of causing the communication unit 80 to execute FTP communication with the imaging device 2 on the basis of the communication connection setting set by the UI processing.

The connection setting management unit 33 performs communication connection setting according to a user input performed on a screen for communication connection setting provided by the UI control unit 31. In particular, the UI control unit 31 performs communication connection setting according to the user input detected in the entry mode process. In addition, thereafter, the update is performed according to the user input detected in the advance mode process.

Note that, basically, a usage mode is assumed in which some settings are changed in the advance mode as necessary after a series of communication connection settings is performed in the entry mode. However, even in a case where the operation in the advance mode is performed without performing the operation in the entry mode, it is conceivable that the connection setting management unit 33 stores and manages the settings.

<3. Presetting Processing>

Hereinafter, a specific processing example related to the communication connection setting between the imaging device 2 and the staff terminal 1 will be described.

First, a processing example of presetting in the staff terminal 1 illustrated as step S1 in FIG. 2 will be described with reference to FIGS. 8 and 9.

Note that the processing of the staff terminal 1 described below is processing performed by the CPU 71 of the information processing device 70 having the function of FIG. 7.

In addition, in each screen example described below together with the flowchart, for example, it is assumed that the information processing device 70 as the staff terminal 1 is a smartphone, and is an example of display contents on a display formed on a housing thereof.

Figure 8:
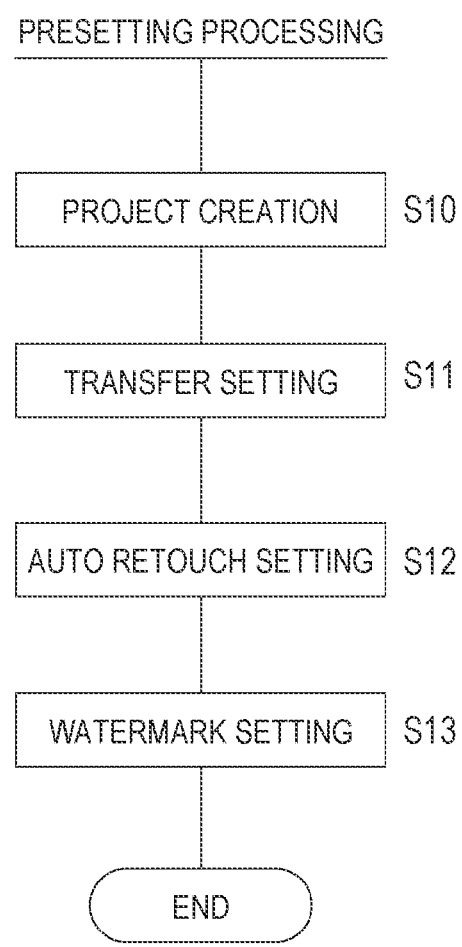
FIG. 8 is a flowchart of presetting processing of the terminal device according to the embodiment.
Figure 9:
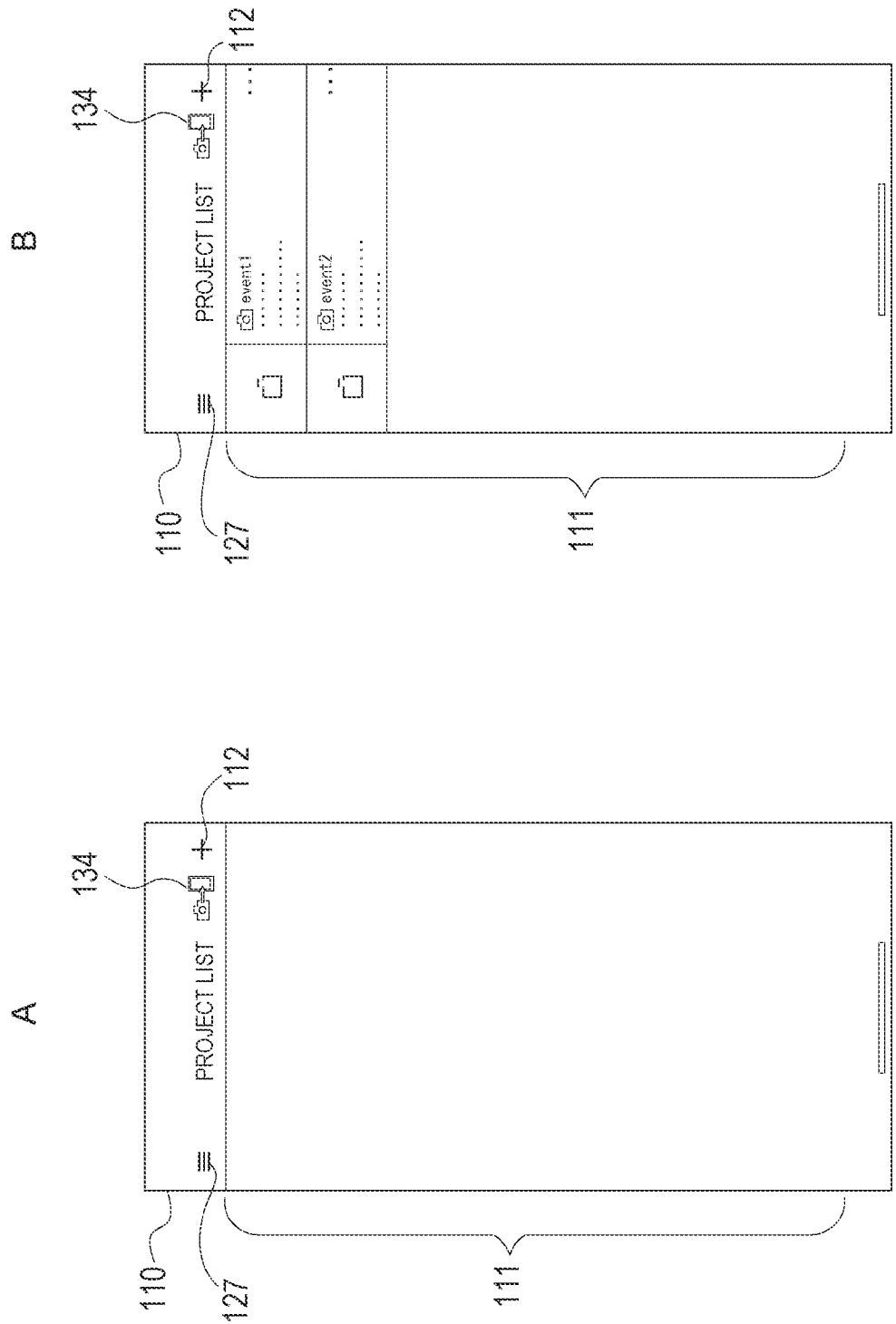
FIG. 9 is an explanatory diagram of a project list screen according to the embodiment.

FIG. 8 illustrates processing of the staff terminal 1.

For example, the camera staff activates the application program using the staff terminal 1 and performs an operation for preparation processing. In response to the operation, in the staff terminal 1, the CPU 71 executes the processing in and after step S10.

In step S10, the staff terminal 1 performs project creation processing. This is processing of setting a target event for creating an image collection.

For example, on the display unit 77 of the staff terminal 1 that has activated the application program, a project list screen 110 is displayed as illustrated in FIG. 9A.

The project list screen 110 is provided with a list area 111 in which event names as individual project targets are displayed in a list. In addition, an addition icon 112, a communication icon 134, a menu icon 127, and the like are displayed.

On such a project list screen 110, the camera staff creates a target project for image collection creation. For example, an operation of creating one project is performed by inputting an event name or the like.

For example, by operating the addition icon 112, a project setting screen (not illustrated) is displayed, and the title of the project (for example, an event name), the date and time of the event, the place, whether or not the auto retouch setting is applied, and the like can be set.

The camera staff appropriately inputs items and performs an operation of setting project contents. In response to this, the staff terminal 1 creates one project and displays it in the list area 111.

FIG. 9B illustrates an example in which two projects with names "event1" and "event2" are displayed. For example, information such as an event name, a date and time, a place, and the like is presented for each project.

In step S10 of FIG. 8, the staff terminal 1 performs control to provide a user interface of such a screen by the function of the UI control unit 31, and performs the project creation processing according to the operation of the camera staff.

Note that this project creation processing is performed, for example, in an online connection state between the staff terminal 1 and the server device 4. In this case, the staff terminal 1 transmits information for the synchronization processing to the server device 4 according to the operation content of the user by the function of the communication control unit 32.

As a result, the server device 4 can also enter information as one project in synchronization.

In step S11 of FIG. 8, the staff terminal 1 performs communication connection setting. The communication connection setting is a setting of FTP transfer with the imaging device 2, and is, for example, a setting of a file format to be transferred, an FTP connection server, or the like.

The staff terminal 1 executes screen display for communication connection setting for the camera staff by the function of the UI control unit 31, and performs necessary transfer setting according to the operation of the camera staff. Details will be described later.

In step S12, the staff terminal 1 performs auto retouch setting. The auto retouch setting is processing of setting a parameter of image editing processing to be commonly applied to each image.

The staff terminal 1 executes screen display for auto retouch setting for the camera staff, and performs necessary auto retouch setting according to the operation of the camera staff.

In addition, this auto retouch setting is managed as one of event data, and is held in synchronization between the staff terminal 1 and the server device 4.

In step S13, the staff terminal 1 performs watermark setting. For example, a camera operator's name or the like can be inserted as a watermark (electronic watermark) into the image of the web gallery. The watermark setting is processing of setting the presence or absence and contents of the watermark.

In addition, this watermark setting is also managed as one of the event data, and is held in synchronization between the staff terminal 1 and the server device 4.

Note that the order of steps S11, S12, and S13 described above may be different. In addition, each processing may be skipped if it is not necessary. In addition, the processing of each step may not be performed as a series of processing, and for example, may be performed each time during activation according to a user's operation.

In particular, in the present embodiment, the communication connection setting in step S11 can be executed at an arbitrary time point. For example, a screen for communication connection setting can be called and executed in the middle of an event.

<4. Communication Connection Setting>

Hereinafter, processing related to communication connection setting with the imaging device 2 in the staff terminal 1 will be described in detail.

For example, a communication icon 134 is prepared on the project list screen 110 as illustrated in FIG. 9B or the event screen 120 in FIG. 3, and the communication status is displayed by, for example, a color change or the like, and communication connection setting is enabled by an operation such as a tap or the like on the communication icon 134.

Figure 10:
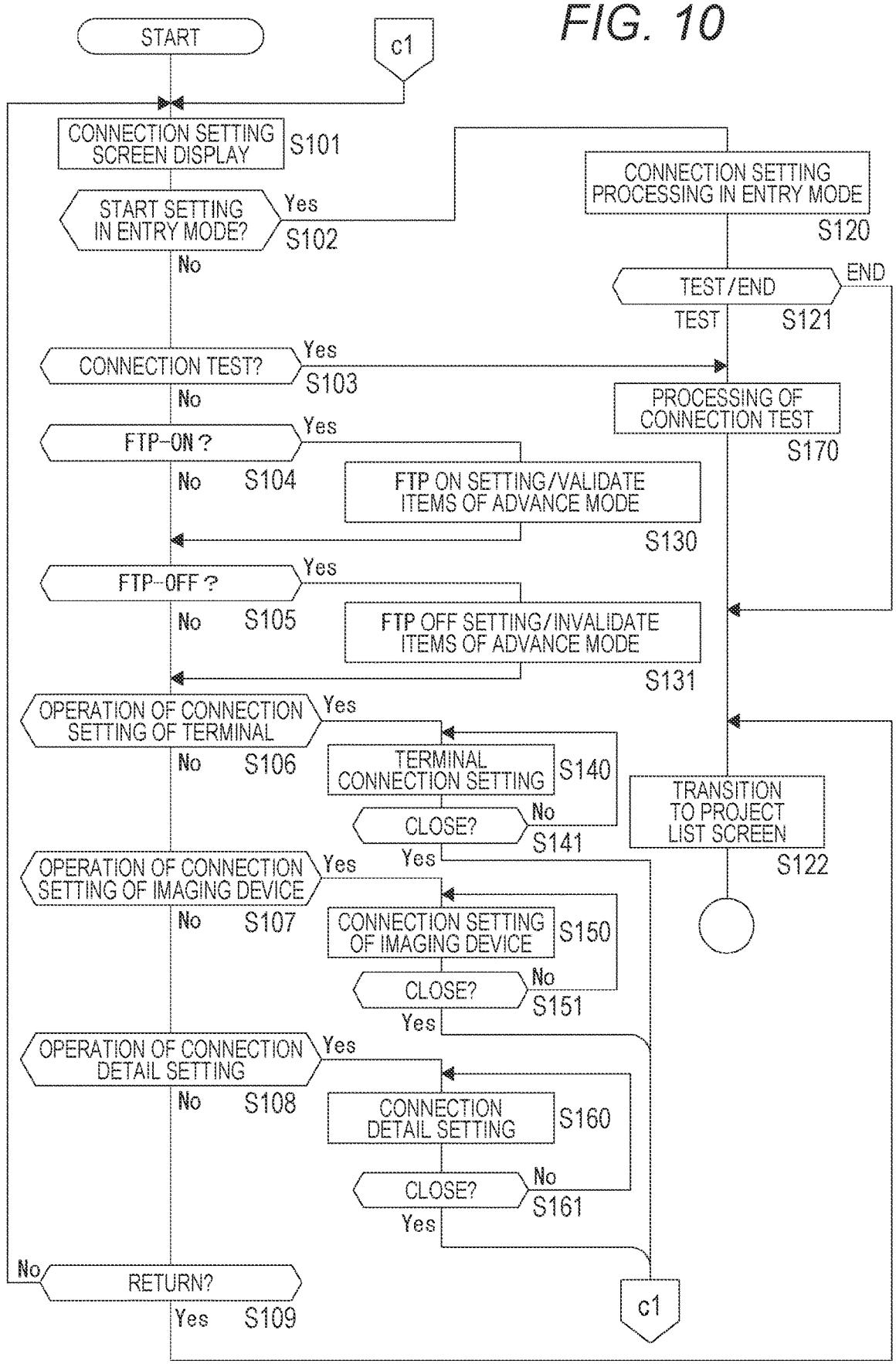
FIG. 10 is a flowchart of communication connection setting processing of the terminal device according to the embodiment.

FIG. 10 illustrates processing of the staff terminal 1 in a case where the communication connection setting is started by operating the communication icon 134 or the like.

Figure 11:
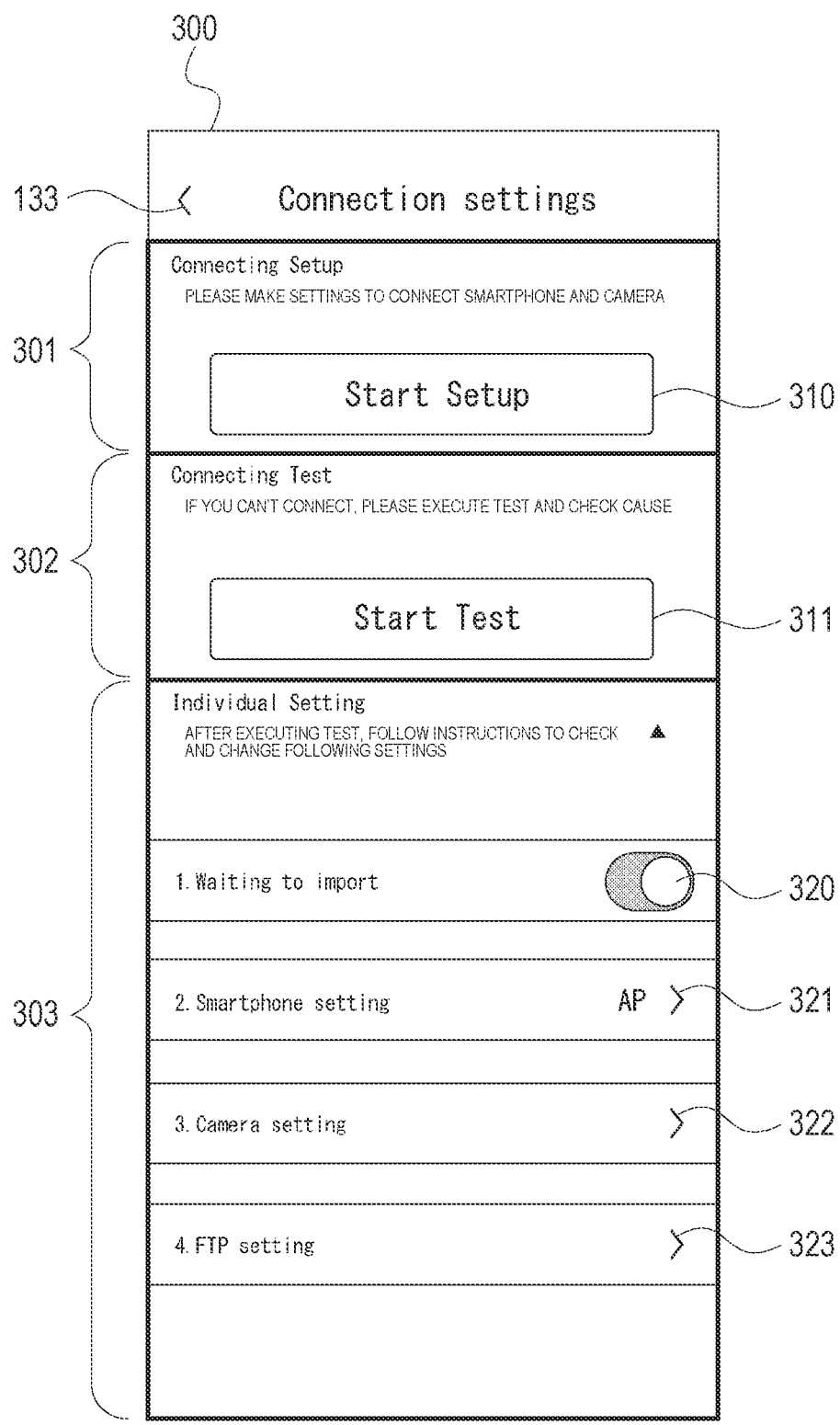
FIG. 11 is an explanatory diagram of a connection setting start screen according to the embodiment.

At step S101, the staff terminal 1 displays a connection setting start screen 300 as illustrated in FIG. 11 on the screen by the function of the UI control unit 31.

On the connection setting start screen 300, a return icon 133 for returning to the screen before the transition is displayed.

In addition, an entry mode area 301, a connection test area 302, and an advance mode area 303 are prepared on the connection setting start screen 300.

The entry mode area 301 is provided with a setup button 310 for starting communication connection setting in the entry mode.

The connection test area 302 is provided with a test button 311 for starting a connection test.

The advance mode area 303 is provided with an FTP switch 320 that operates on/off of FTP communication. In addition, in the advance mode area 303, a terminal connection setting operation unit 321, a camera connection setting operation unit 322, and a detailed setting operation unit 323 are provided.

In a state where such a connection setting start screen 300 is displayed in step S101 of FIG. 10, the staff terminal 1 monitors a user operation or the like in a monitoring loop from step S102 to step S109.

In step S102, the staff terminal 1 checks whether or not an operation for giving an instruction on the start of the communication connection setting in the entry mode has been performed. That is, it is an operation of the setup button 310.

In a case where the operation of the setup button 310 is detected, the staff terminal 1 proceeds to step S120 and performs communication connection setting processing in the entry mode.

In the entry mode, various setting screens are sequentially displayed according to a user operation, and a setting operation of the user on the screen is detected to perform communication connection setting.

Figure 12:
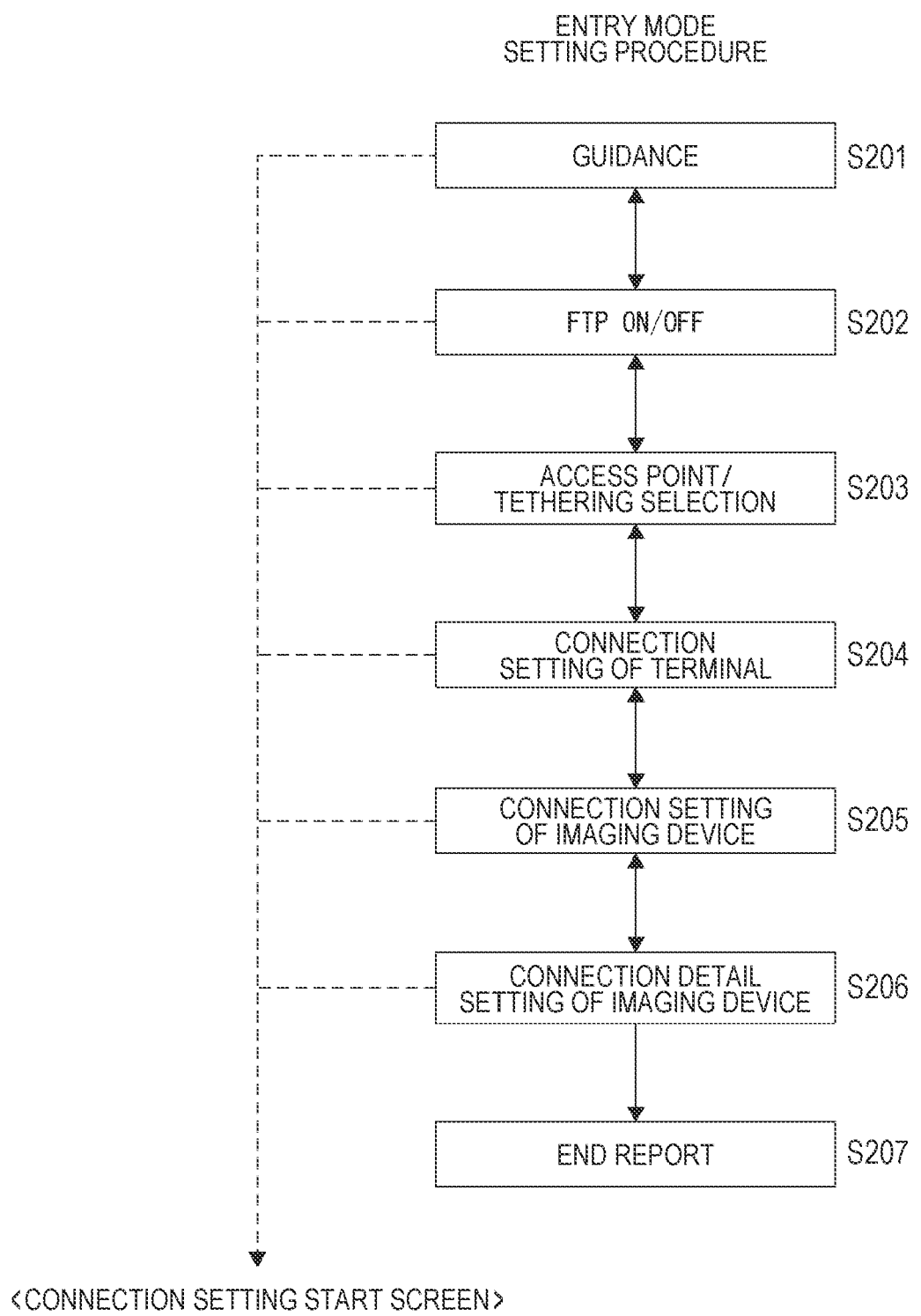
FIG. 12 is a flowchart illustrating a procedure of an entry mode according to the embodiment.

A transition of the communication connection setting process is illustrated in FIG. 12. Note that, in each step illustrated in FIG. 12, the corresponding screen is displayed, and the process advances/retreats in accordance with the advancing/retreating operation of the screen by the user. In this sense, in FIG. 12, arrows capable of transitioning between steps are attached. In addition, a broken line arrow indicates that the screen is closed to return to the connection setting start screen 300.

Figure 13:
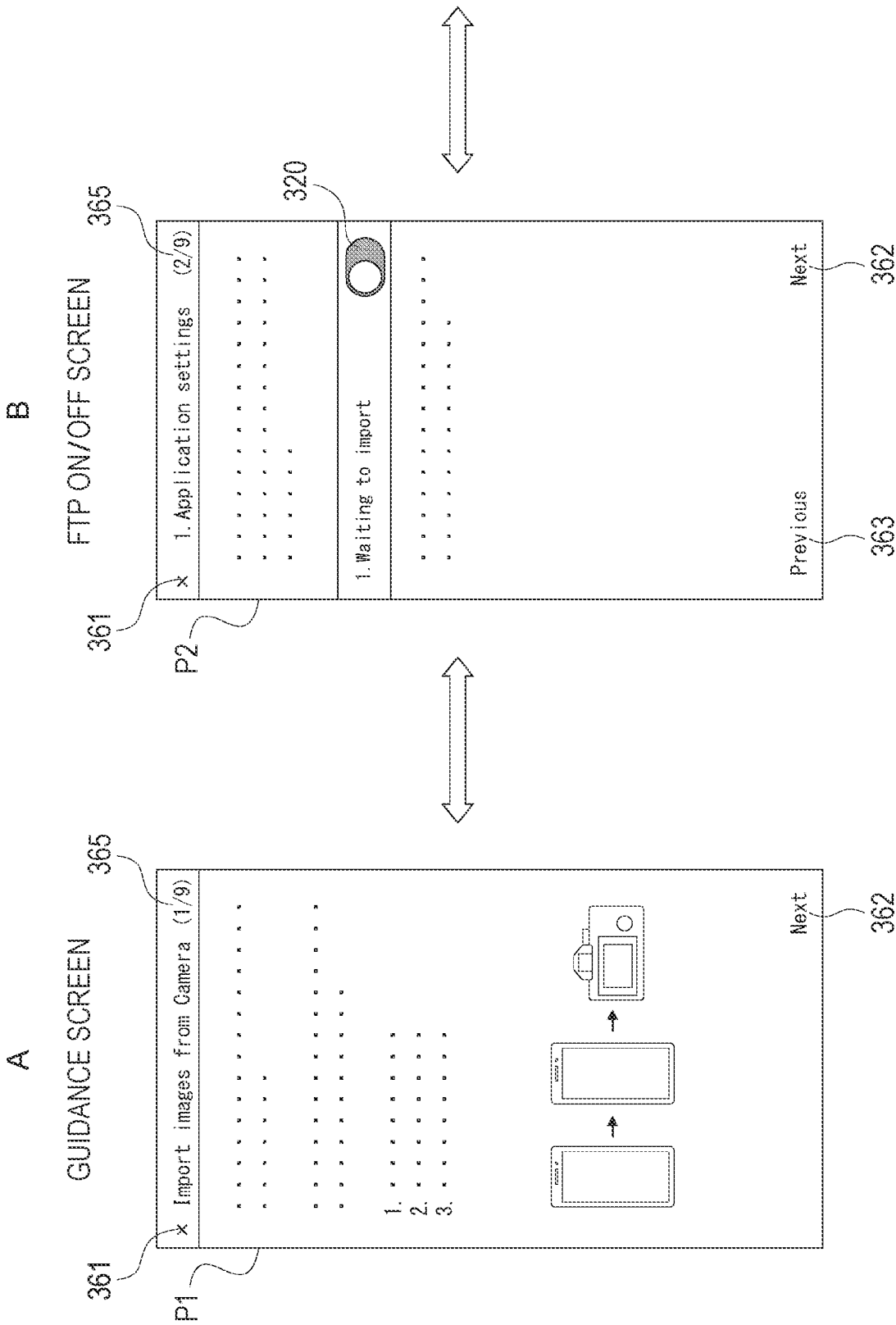
FIG. 13 is an explanatory diagram of a setting screen according to the embodiment.

The staff terminal 1 first performs guidance display in step S201. FIG. 13A illustrates a guidance screen P1.

On the guidance screen P1, an explanation related to a setting procedure related to image transfer of the staff terminal 1 from the imaging device 2 or the like is described and presented to the user.

On the guidance screen P1, "1/9" is displayed as a page number 365. This indicates that the setting of the entry mode is performed on nine screens and it is the first page.

When a next button 362 is operated on the guidance screen P1, the process proceeds to step S202 in FIG. 12.

The staff terminal 1 performs FTP on/off setting in step S202. In this case, an FTP on/off screen P2 as illustrated in FIG. 13B is displayed. The page number 365 is "2/9".

On the FTP on/off screen P2, an FTP switch 320 for operating on/off of FTP communication with the imaging device 2 is displayed. This is the same as the FTP switch 320 in the advance mode area 303 on the connection setting start screen 300 in FIG. 11, and is an operator with which the user can operate on/off of the FTP communication.

In a case where the communication connection setting is performed, the user turns on the FTP switch 320 (or confirms that it is turned on), and the process proceeds to the next step.

When a previous button 363 is operated on the FTP on/off screen P2, the staff terminal 1 returns to step S201 in FIG. 12 and returns the display to the guidance screen P1. Therefore, the user can arbitrarily return to the guidance screen P1 to confirm the guidance content even after advancing the screen.

When the next button 362 is operated on the FTP on/off screen P2, the process proceeds to step S203.

Figure 14:
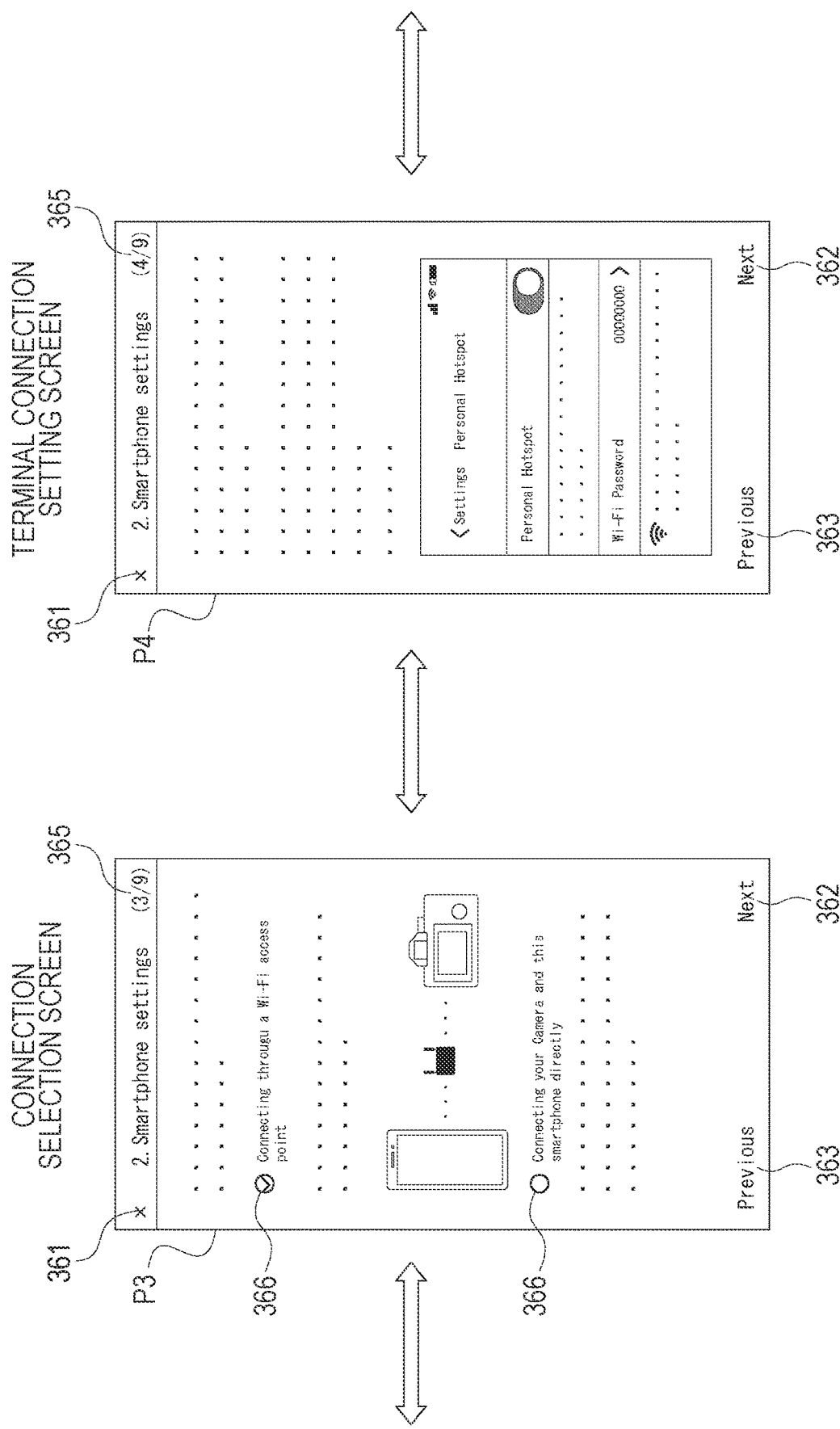
FIG. 14 is an explanatory diagram of a setting screen according to the embodiment.

The staff terminal 1 performs setting of access point/tethering selection in step S203. In this case, a connection selection screen P3 as illustrated in FIG. 14A is displayed. The page number 365 is "3/9".

On the connection selection screen P3, check boxes 366 are prepared so that the user can select whether communication with the imaging device 2 is performed via an access point or by tethering (personal hotspot).

When the previous button 363 is operated on the connection selection screen P3, the staff terminal 1 returns to step S202 of FIG. 12 and returns the display to the FTP on/off screen P2.

When the next button 362 is operated on the connection selection screen P3, the process proceeds to step S204.

The staff terminal 1 performs connection setting of the staff terminal 1 in step S204. In this case, a terminal connection setting screen P4 as illustrated in FIG. 14B is displayed. The page number 365 is "4/9".

On the terminal connection setting screen P4, setting operations according to the selected connection method, such as, for example, tethering setting, access point setting, and the like are enabled.

When the previous button 363 is operated on the terminal connection setting screen P4, the staff terminal 1 returns to step S203 and returns the display to the connection selection screen P3.

When the next button 362 is operated on the terminal connection setting screen P4, the process proceeds to step S205.

Figure 15:
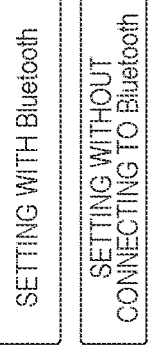
FIG. 15 is an explanatory diagram of a setting screen according to the embodiment.

The staff terminal 1 performs connection setting of the imaging device 2 in step S205. In this case, a camera connection setting screen P5 as illustrated in FIG. 15A is displayed. The page number 365 is "5/9".

On the camera connection setting screen P5, an operation of connection setting on the imaging device 2 side is enabled.

When the previous button 363 is operated on the camera connection setting screen P5, the staff terminal 1 returns to step S204 and returns the display to the terminal connection setting screen P4.

When the next button 362 is operated on the camera connection setting screen P5, the process proceeds to step S206.

The staff terminal 1 performs detailed connection setting of the imaging device 2 in step S206. For this detailed setting, the staff terminal 1 displays the connection detail setting screens P6, P7, and P8 as illustrated in FIGS. 15B, 16A, and 16B. The page numbers 365 are "6/9", "7/9", and "8/9", respectively.

The connection detail setting screens P6, P7, and P8 enable more detailed operation of the connection setting on the imaging device 2 side. For example, it is possible to perform operation/confirmation of setting of whether or not to use Bluetooth, and setting of a host name, a port number, user information, FTP, an image data type, and the like.

When the previous button 363 is operated on the connection detail setting screen P6, the staff terminal 1 returns to step S205 and returns the display to the camera connection setting screen P5.

A transition is made by the previous button 363 and the next button 362 between the connection detail setting screens P6, P7, and P8.

When the next button 362 is operated on the connection detail setting screen P8, the process proceeds to step S207.

Figure 17:
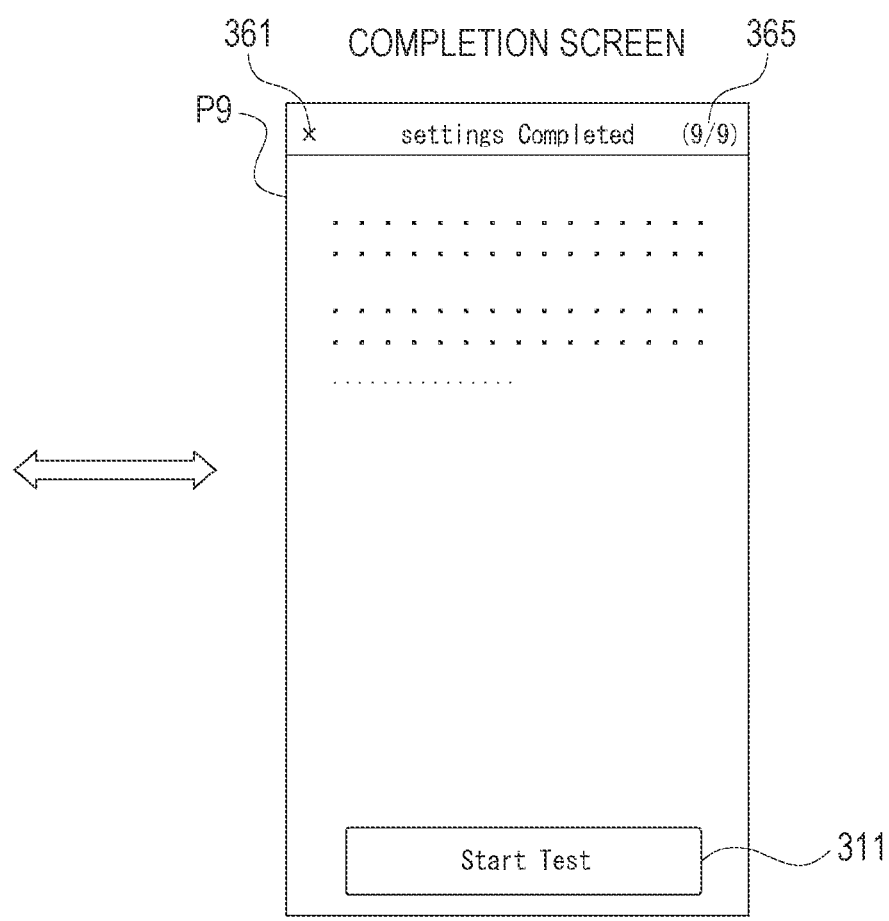
FIG. 17 is an explanatory diagram of a setting screen according to the embodiment.

In step S207, the staff terminal 1 reports the end of the communication connection setting. For this purpose, the staff terminal 1 displays a completion screen P9 as illustrated in FIG. 17. The page number 365 is "9/9".

The user can know the completion of the communication connection setting on the completion screen P9.

Note that the completion screen P9 displays the same test button 311 as the test button 311 on the connection setting start screen 300.

In step S120 of FIG. 10, the above-described nine setting screens (the guidance screen P1 to the completion screen P9) sequentially transition to provide the user with an environment of the setting operation.

Then, the setting by the user operation in the entry mode described above is stored in, for example, a storage unit 79 by the function of the connection setting management unit 33 by the staff terminal 1, and is managed as a valid communication connection setting thereafter.

After reaching the completion screen P9, the staff terminal 1 proceeds from step S121 to the connection test processing of step S170 by the user operating the test button 311 on the completion screen P9.

Note that, when the close button 361 is operated on the guidance screen P1, the FTP on/off screen P2, the connection selection screen P3, the terminal connection setting screen P4, the camera connection setting screen P5, the connection detail setting screens P6, P7, and P8, and the completion screen P9, the communication connection setting in the entry mode is canceled at that time. In this case, for example, it is conceivable to proceed from step S121 to step S122 in FIG. 10 and return to the project list screen 110. Note that, in this case, the screen may transition to the connection setting start screen 300 (step S101 in FIG. 10).

In step S103 of FIG. 10, the staff terminal 1 checks the operation of the connection test. That is, it is an operation of the test button 311 in the connection test area 302 of FIG. 11. In that case, the process proceeds to the connection test processing in step S170.

The connection test processing will be described later.

Steps S104 to S108 are processing of monitoring the operation of the advance mode area 303 on the connection setting start screen 300 of FIG. 11.

In step S104, the staff terminal 1 checks whether or not the FTP communication has been turned on by the operation of the FTP switch 320 in the advance mode area 303.

When the FTP communication is turned on, the staff terminal 1 proceeds to step S130, performs the FTP communication-on setting, and validates the operation of the items (terminal connection setting operation unit 321, camera connection setting operation unit 322, and detailed setting operation unit 323) in the advance mode area 303.

In step S105, the staff terminal 1 checks whether or not the FTP communication has been turned off by the operation of the FTP switch 320 in the advance mode area 303.

When the FTP communication is turned off, the staff terminal 1 proceeds to step S131, performs the FTP communication-off setting, and invalidates the operation of the items (terminal connection setting operation unit 321, camera connection setting operation unit 322, and detailed setting operation unit 323) in the advance mode area 303.

That is, the user can arbitrarily turn on/off the FTP communication using the FTP switch 320 in the advance mode area 303.

In addition, when the FTP communication is turned off, the terminal connection setting operation unit 321, the camera connection setting operation unit 322, and the detailed setting operation unit 323 cannot be operated. For example, they are grayed out.

Note that, when the FTP communication is turned on on the FTP on/off screen P2 in the entry mode, the terminal connection setting operation unit 321, the camera connection setting operation unit 322, and the detailed setting operation unit 323 can be operated. In this case, the FTP switch 320 in the advance mode area 303 also indicates the ON state.

In step S106, the staff terminal 1 checks whether or not the terminal connection setting operation unit 321 in the advance mode area 303 is operated when the FTP communication is turned on.

In a case where the terminal connection setting operation unit 321 is operated, the staff terminal 1 performs terminal connection setting processing in step S140.

Figure 18:
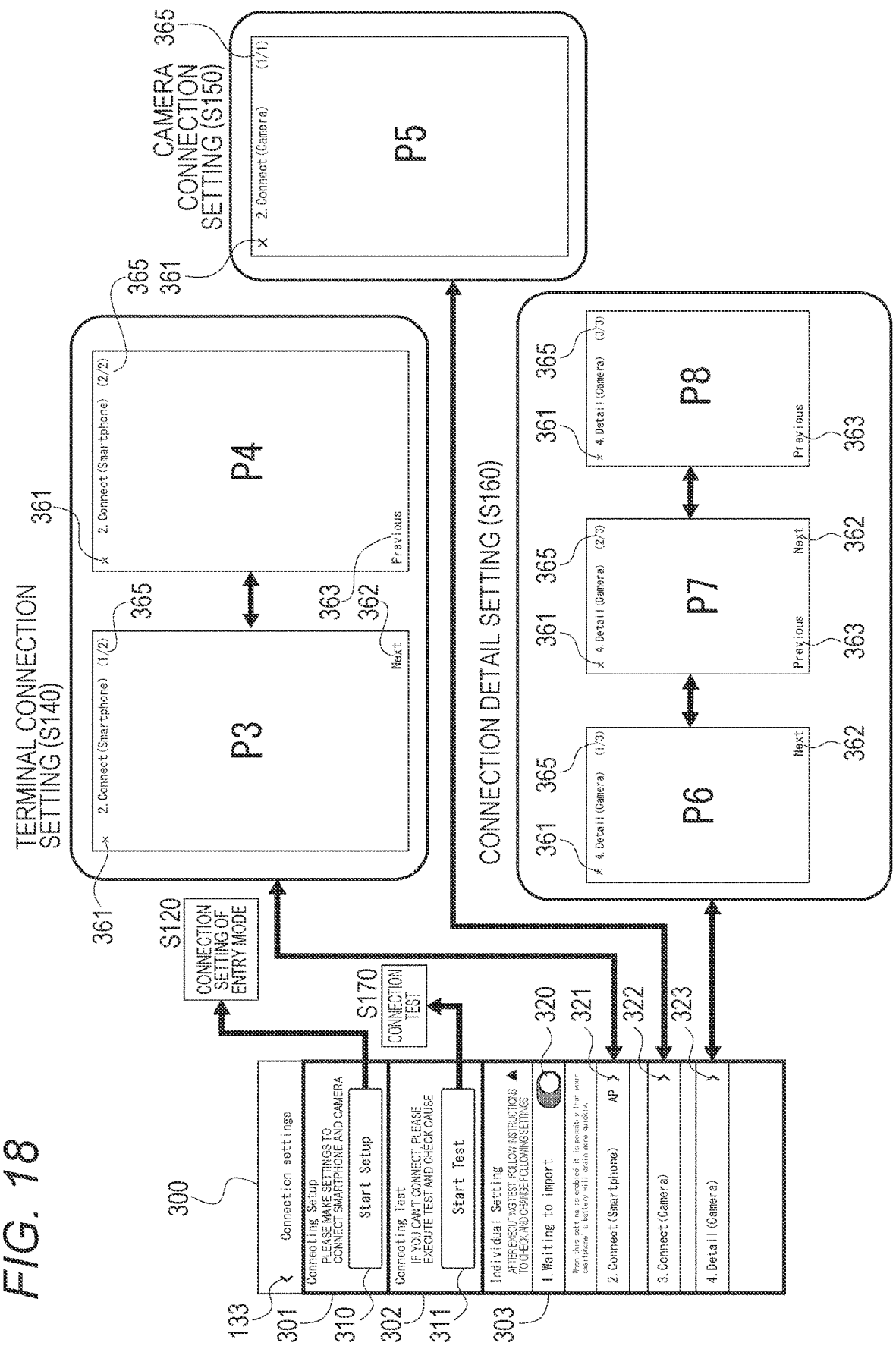
FIG. 18 is an explanatory diagram of transition from a connection setting start screen according to the embodiment.

FIG. 18 illustrates transitions from the connection setting start screen 300.

In a case where the terminal connection setting operation unit 321 is operated, processing on the connection selection screen P3 and the terminal connection setting screen P4 is performed as the terminal connection setting in step S140.

First, a connection selection screen P3 is displayed. In this case, the page number 365 is "1/2". This is because it is the first page of the two pages for terminal connection setting.

The screen transitions to a terminal connection setting screen P4 by the next button 362 on the connection selection screen P3. The page number 365 on the terminal connection setting screen P4 is "2/2".

The screen returns to the connection selection screen P3 by the previous button 363 on the terminal connection setting screen P4.

The connection selection screen P3 and the terminal connection setting screen P4 in this case are setting screens of the same display mode as the connection selection screen P3 and the terminal connection setting screen P4 in FIGS. 14A and 14B described in the entry mode. Only the number of the page number 365 and the presence or absence of the previous button 363 and the next button 362 are different, and the contents related to the substantial setting are the same in the screen.

Therefore, the user can perform an operation of connection selection and a connection setting on the terminal side in the same operation environment as the setting operation in the entry mode, and it is easy to understand that it is a partial change of the setting in the entry mode.

As illustrated in FIG. 18, a close button 361 is provided on the connection selection screen P3 and the terminal connection setting screen P4. In a case where the user operates the close button 361, the staff terminal 1 recognizes the closing operation in step S141 of FIG. 10, and returns to step S101 as indicated by "c1". That is, the screen returns to the connection setting start screen 300.

In step S107, the staff terminal 1 checks whether or not the camera connection setting operation unit 322 in the advance mode area 303 is operated when the FTP communication is turned on.

In a case where the camera connection setting operation unit 322 is operated, the staff terminal 1 performs camera connection setting processing in step S150.

As illustrated in FIG. 18, in a case where the camera connection setting operation unit 322 is operated, processing on the camera connection setting screen P5 is performed as the camera connection setting in step S150.

In this case, the page number 365 is "1/1". This is because the screen used for the camera connection setting is one page in total.

The camera connection setting screen P5 in this case is a setting screen having the same display mode as the camera connection setting screen P5 in FIG. 15A described in the entry mode. Only the number of the page number 365 and the presence or absence of the previous button 363 and the next button 362 are different, and the contents related to the substantial setting are the same in the screen.

Therefore, the user can perform the operation of the connection setting on the imaging device 2 side in the same operation environment as the setting operation in the entry mode, and it is easy to understand that the change is a part of the setting performed in the entry mode.

When the close button 361 on the camera connection setting screen P5 of FIG. 18 is operated, the staff terminal 1 returns from step S151 to step S101. That is, the screen returns to the connection setting start screen 300.

In step S108 of FIG. 10, the staff terminal 1 checks the operation of the detailed setting operation unit 323 in the advance mode area 303.

In a case where the detailed setting operation unit 323 is operated, the staff terminal 1 performs detailed setting processing in step S160.

As illustrated in FIG. 18, in a case where the detailed setting operation unit 323 is operated, processing on the connection detail setting screens P6, P7, and P8 is performed as the connection detail setting in step S160.

First, a connection detail setting screen P6 is displayed. In this case, the page number 365 is "1/3". This is because it is the first page among the three pages for connection detail setting.

The screen transitions to a connection detail setting screen P7 by the next button 362 on the connection detail setting screen P6. The page number 365 on the connection detail setting screen P7 is "2/3".

The screen transitions to a connection detail setting screen P8 by the next button 362 on the connection detail setting screen P7. The page number 365 on the connection detail setting screen P7 is "3/3".

The screen returns to the connection detail setting screen P7 by the previous button 363 on the connection detail setting screen P8.

The screen returns to the connection detail setting screen P6 by the previous button 363 on the connection detail setting screen P7.

The connection detail setting screens P6, P7, and P8 in this case are setting screens of the same display mode as the connection detail setting screens P6, P7, and P8 in FIGS. 15B, 16A, and 16B described in the entry mode. Only the number of the page number 365 and the presence or absence of the previous button 363 and the next button 362 are different, and the contents related to the substantial setting are the same in the screen.

Therefore, the user can perform an operation of connection selection and a connection setting on the terminal side in the same operation environment as the setting operation in the entry mode, and it is easy to understand that it is a partial change of the setting.

As illustrated in FIG. 18, a close button 361 is provided on the connection detail setting screens P6, P7, and P8. In a case where the user operates the close button 361, the staff terminal 1 recognizes the closing operation in step S161 and returns to step S101. That is, the screen returns to the connection setting start screen 300.

As the above-described steps S130, S131, S140, S150, and S160, the staff terminal 1 stores the change of the setting by the user operation in the processing in the advance mode in, for example, the storage unit 79 by the function of the connection setting management unit 33, and is managed as a valid communication connection setting thereafter.

Note that the number of screens in the entry mode, the setting content, the type of the setting content that can be operated in the advance mode, and the like described above are examples, and other screen examples, setting content examples, transition orders, and the like are conceivable in various manners.

As illustrated in FIG. 11, a return icon 133 is provided on the connection setting start screen 300. In a case where the return icon 133 is operated, the staff terminal 1 proceeds from step S109 to step S122 in FIG. 10 and returns to the project list screen 110. Note that, in a case where the screen transitions from the event screen 120 to the connection setting start screen 300, the screen may return to the event screen 120.

Next, the connection test in step S170 in FIG. 10 will be described.

Figure 19:
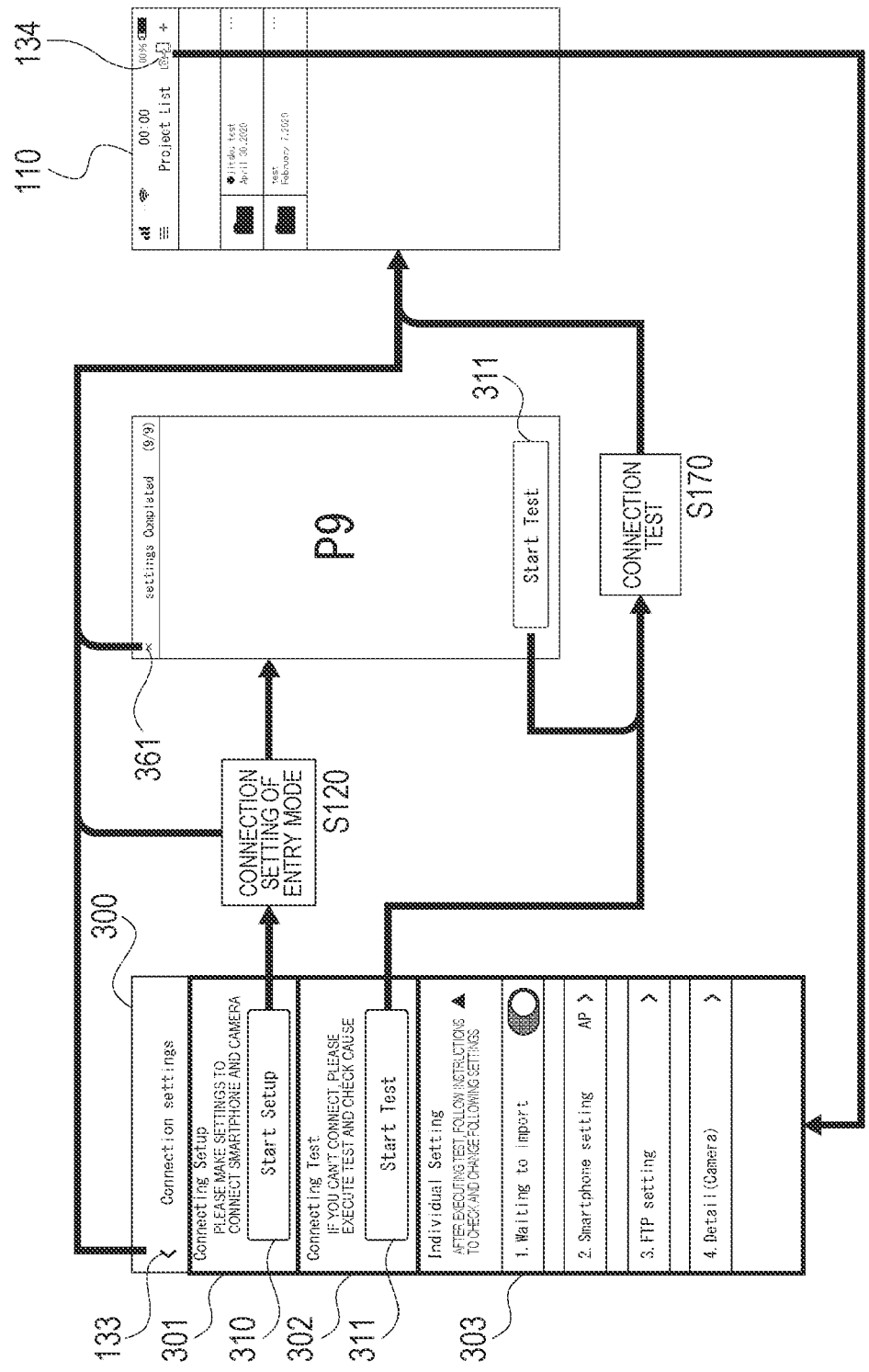
FIG. 19 is an explanatory diagram of transition of a connection test according to the embodiment.

FIG. 19 illustrates a transition to a connection test. As illustrated in the drawing, the connection test processing is performed by operating the test button 311 on the completion screen P9 on which the communication connection setting in the entry mode (step S120) is completed or by operating the test button 311 in the connection test area 302. The connection test processing in step S170 is performed in three steps of presenting a connection test first screen 351 in FIG. 20, a connection test second screen 352 in FIG. 21, and a connection test third screen 353 in FIG. 22 to the user while actually communicating with the imaging device 2.

Note that, a transition can be made by the next button 362 and the previous button 363 between the connection test first screen 351, the connection test second screen 352, and the connection test third screen 353.

Figure 20:
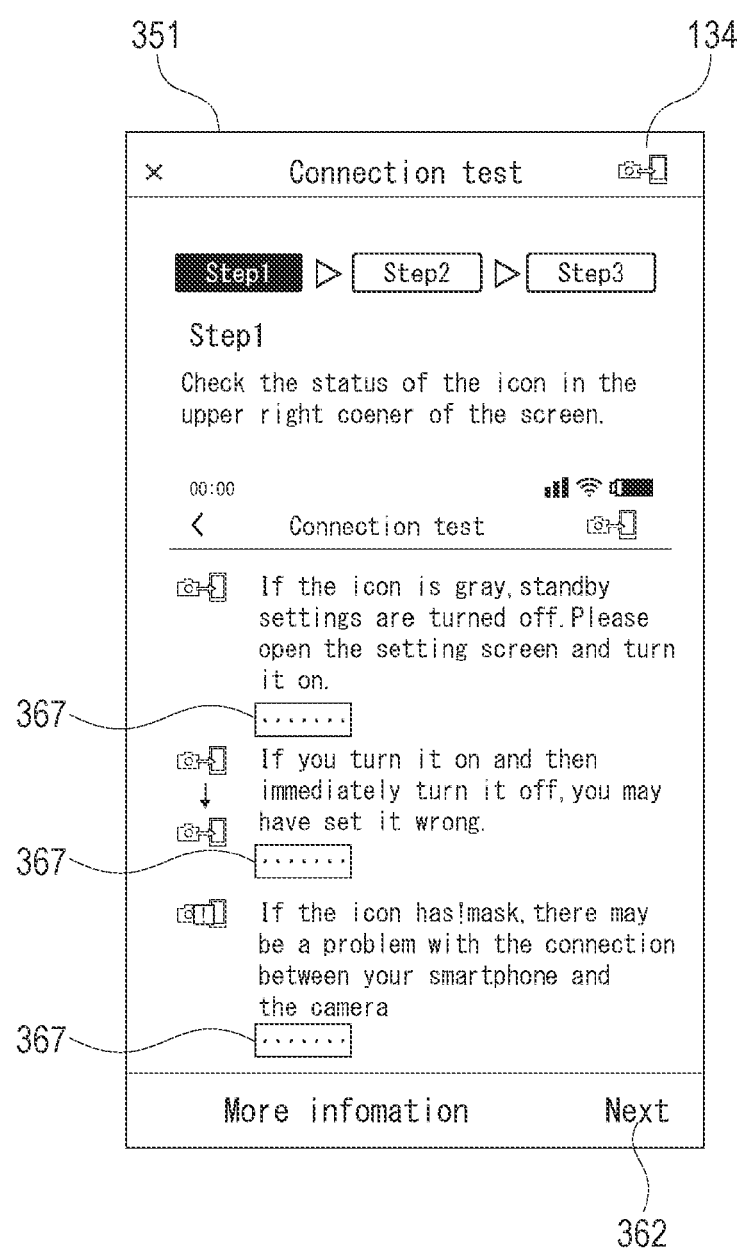
FIG. 20 is an explanatory diagram of a connection test first screen according to the embodiment.

In the connection test first screen 351 of FIG. 20, it is presented to the user that the communication icon 134 in the upper right of the screen should be checked, and various states are illustrated in the display mode of the icon.

For example, the current error situation or the like is presented by color, blinking, superimposing of "!" mark, or the like of the communication icon 134.

The user can operate a transition button 367 according to the content to be presented to correct the setting in the advance mode or request the guidance display.

Figure 21:
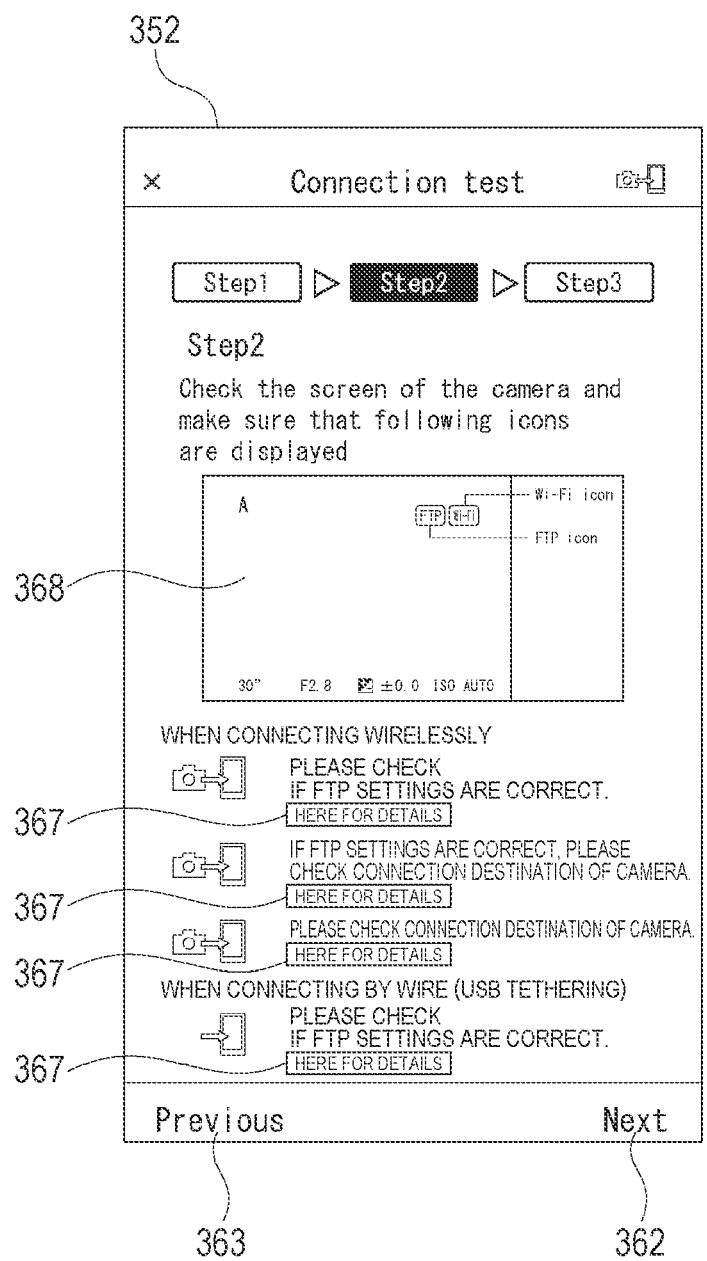
FIG. 21 is an explanatory diagram of a connection test second screen according to the embodiment.

In the connection test second screen 352 of FIG. 21, it is checked whether or not the screen display of the imaging device 2 is in a predetermined state. For example, a guide display 368 imitating the display unit of the imaging device 2 is illustrated, and the user is caused to confirm whether the icon display is appropriate on the display unit of the imaging device 2.

According to various states, the user can operate the transition button 367 to correct the setting in the advance mode or request guidance display.

Figure 22:
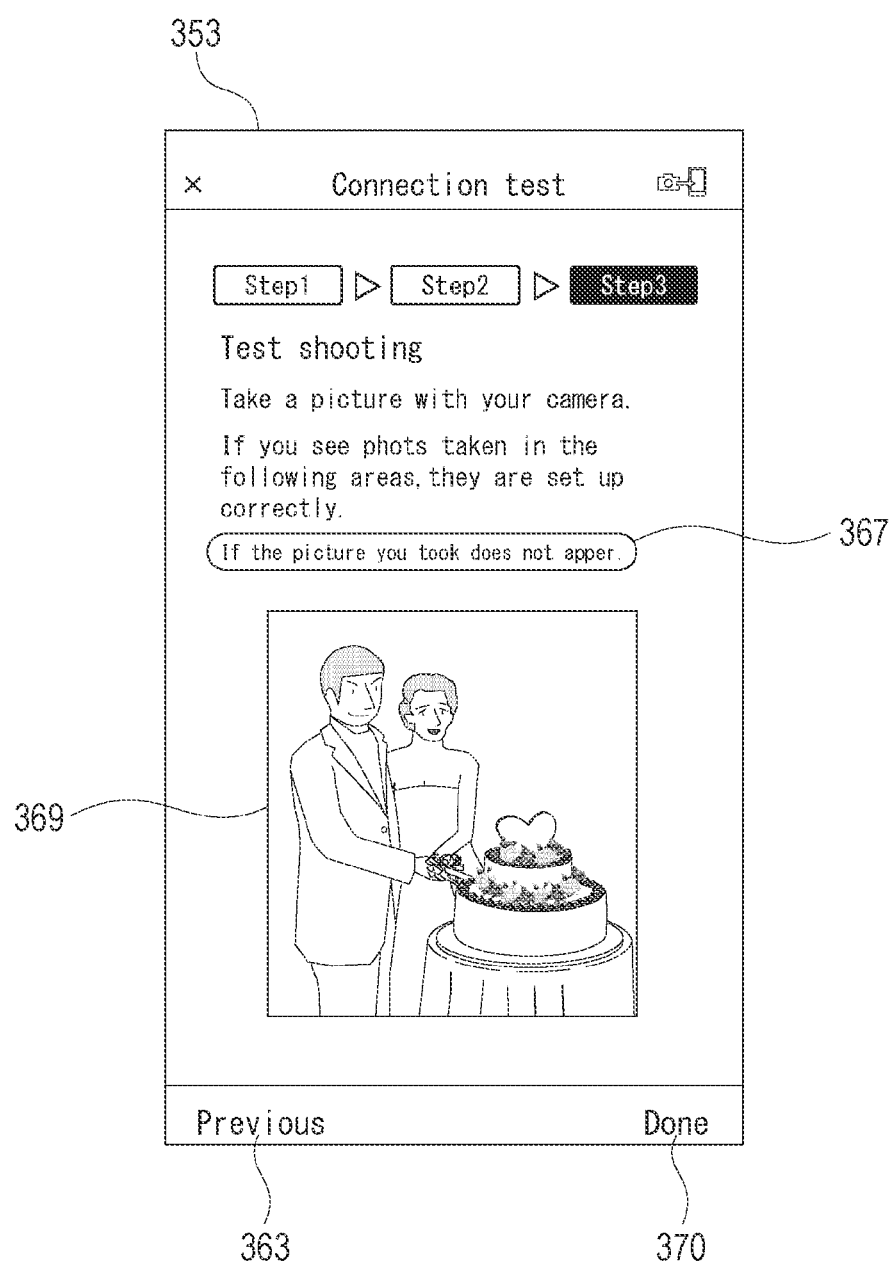
FIG. 22 is an explanatory diagram of a connection test third screen according to the embodiment.

On the connection test third screen 353 in FIG. 22, image transfer from the imaging device 2 is actually performed. When the user is caused to perform imaging by the imaging device 2, the image is transferred and the transfer image 369 is displayed.

In a case where the transfer image 369 is not displayed, the user can perform a handling process using the transition button 367.

By displaying the transfer image, the user can recognize that the connection setting has been appropriately completed. In this case, the user presses a completion button 370 to complete the test. As illustrated in FIG. 19, when the test is completed, the screen returns to the project list screen 110.

<10. Conclusion and Modifications>

In the above embodiments, the following effects can be obtained.

The staff terminal 1 which is an information processing device according to the embodiment includes the UI control unit 31 that performs processing of an entry mode (first connection setting mode) of detecting a user input for a plurality of setting items provided on a plurality of setting screens in a process of displaying the plurality of setting screens for communication connection setting with the imaging device 2 in a predetermined order, and processing of an advance mode (second connection setting mode) of displaying a corresponding setting screen on the basis of a designation operation for some of the plurality of setting items and detecting a user input to the setting screen.

By the entry mode, the user can easily set the staff terminal 1 to a state in which the staff terminal 1 can communicate with the imaging device 2. In particular, since the necessary setting items appear in accordance with the screen, forgetting to set the necessary items is less likely to occur, and the setting can be completed by an easy-to-understand operation. Moreover, since the advance mode is prepared, for example, in a case where the setting is once performed in the entry mode and then a part of the setting is changed, only the correction can be directly performed. For example, when the entry mode is used in a case where it is desired to change a part of the setting, it is necessary to advance a large number of screens including screens unnecessary for setting change. However, by using the advance mode, such trouble is not required. For this reason, the advance mode is a mode that is convenient when it is necessary to suddenly change the setting or the like at an event venue or the like.

The staff terminal 1 according to the embodiment includes the connection setting management unit 33 that performs the communication connection setting according in accordance with the user input detected in the entry mode process by the UI control unit 31, and updates the communication connection setting in accordance with the user input detected in the processing of the advance mode after the processing of the entry mode.

As a result, it is possible to always reflect the latest setting contents as the connection setting, and it is possible to avoid the user from being confused by the setting of the entry mode and the setting of the advance mode being both present.

In the embodiment, the UI control unit 31 displays the connection setting start screen 300 that enables both the start operation in the entry mode and the designation operation of the setting item in the advance mode. That is, the entry mode area 301 and the advance mode area 303 are provided together on the connection setting start screen 300.

As a result, the user can arbitrarily use the entry mode or the advance mode on the connection setting start screen 300. In particular, by providing an interface for each operation without requiring screen switching or mode switching between the entry mode and the advance mode, usability is improved.

In the embodiment, in the entry mode, the setting screens (P1 to P9) related to a plurality of setting items including the connection setting on the information processing device (staff terminal 1) side and the connection setting on the imaging device 2 side are sequentially displayed, and in the advance mode, at least the setting item of the connection setting on the information processing device (staff terminal 1) side can be designated (see the terminal connection setting operation unit 321).

By providing the entry mode, the user can easily perform connection setting while transitioning the screens. In addition, there is a case where it is desired to update only the setting on the information processing device (staff terminal 1) side used as a terminal that communicates with the imaging device 2, but in that case, it is possible to efficiently change the setting in the advance mode without redoing all the settings in the entry mode. A case where it is desired to change only the connection setting of the terminal due to a change in the situation of the staff terminal 1, the use environment, or the like is likely to occur, and thus such processing in the advance mode is useful for improving the efficiency of the operation.

In the embodiment, in the advance mode, at least a setting item of the connection setting on the imaging device 2 side can be designated (see the camera connection setting operation unit 322).

As a result, in a case where the user desires to update only the setting on the imaging device 2 side, the user can efficiently change the setting in the advance mode without redoing all the settings in the entry mode. Since it is assumed that there is a case where it is desired to change only the connection setting of the imaging device 2, such processing in the advance mode is useful for improving the efficiency of the operation.

In the embodiment, in the advance mode, at least a setting item of the connection detail setting can be designated (see the detailed setting operation unit 323).

As a result, in a case where the user desires to update only the detailed settings, the user can efficiently change the settings in the advance mode without redoing all the settings in the entry mode.

In the embodiment, in the advance mode, at least a setting item of the on/off setting of the FTP communication connection can be designated (see the FTP switch 320).

As a result, the user can easily operate the communication connection on/off state by the processing in the advance mode.

In the embodiment, the terminal connection setting operation unit 321, the camera connection setting operation unit 322, and the detailed setting operation unit 323 in the advance mode area 303 can be operated in a case where the setting item of the on/off setting of the communication connection by the FTP switch 320 is turned on.

As a result, it is possible to prevent an unnecessary setting operation from being started when the FTP communication connection is turned off.

In the embodiment, the setting screen (connection selection screen P3, terminal connection setting screen P4) for connection setting on the information processing device (staff terminal 1) side in the entry mode and the setting screen (P3, P4) for connection setting on the information processing device (staff terminal 1) side in the advance mode are screens indicating setting contents in the same mode.

As a result, the user can easily understand that the same setting item as the connection setting of the staff terminal 1 can be operated in the entry mode and the advance mode.

In the embodiment, the setting screen (camera connection setting screen P5) for connection setting on the imaging device 2 side in the entry mode and the setting screen (P5) for connection setting on the imaging device 2 side in the advance mode are screens indicating the setting contents in the same mode.

As a result, the user can easily understand that the same setting item as the connection setting of the imaging device 2 can be operated in the entry mode and the advance mode.

When the communication connection setting in the entry mode is completed, the UI control unit 31 according to the embodiment displays a screen (completion screen P9) on which an operation for giving an instruction on execution of a test of communication connection can be performed.

As a result, the user can easily proceed to the connection test when completing the communication connection setting in the entry mode, and can confirm whether or not the setting is appropriate.

The connection setting start screen 300 according to the embodiment is operable to give an instruction on execution of a test of communication connection (see the connection test area 302).

As a result, the user can perform an operation of the connection test at an arbitrary timing on the connection setting start screen 300.

For example, it is normally assumed that the communication connection setting needs to be changed due to a change in a communication environment or the like at an event site. In such a case, the setting change is effective in the advance mode, but at that time, it is desirable to perform a connection test to confirm whether or not the setting has been correctly changed. Assuming such a use case, the fact that the connection test can be performed from the same connection setting start screen 300 in a case where the setting is changed in the advance mode is extremely excellent in operability.

The staff terminal 1 according to the embodiment includes the communication control unit 32 that controls communication with the imaging device 2 on the basis of the communication connection setting managed by the connection setting management unit 33, in which the communication control unit 32 causes image transfer from the imaging device 2 to be performed at the time of the test of the communication connection, and the UI control unit 31 performs processing of displaying transfer images (see FIG. 22).

As a result, the camera staff can actually confirm the transfer of the captured images in a case where the connection setting is made or changed. It is desirable for the camera staff to be able to confirm whether or not the image transfer has been reliably performed by the connection test since the image transfer cannot be failed in an event or the like such as a wedding or the like.

The UI control unit 31 according to the embodiment performs processing of causing a display indicating an error content to be executed in a case where an error occurs in the test of the communication connection (see FIGS. 20 and 21).

As a result, the camera staff can confirm the inconvenience of the setting by the connection test in a case where the connection setting is made or changed. Therefore, it can be targeted by redoing the settings or the like.

The communication connection setting with the imaging device 2 of the embodiment is assumed to be a communication connection setting of wired communication or short-range wireless communication.

The wired communication is, for example, communication by a transmission line such as a universal serial bus (USB) cable or the like. The short-range wireless communication refers to wireless communication with a short communication distance, and specifically corresponds to communication of standards such as Bluetooth, Wi-Fi, NFC, and the like, information transmission by infrared communication, and the like. That is, the present disclosure is applied to communication between the information processing device (staff terminal 1) side and the imaging device 2 side at positions close to each other.

In the embodiment, the entry mode and the advance mode can be arbitrarily selected on the connection setting start screen 300, but for example, only the entry mode may be enabled at the first time when the communication connection setting has never been performed.

In addition, only the entry mode may be enabled for the first time on a project basis.

By allowing the advance mode area 303 to be operable after the entry mode, the advance mode can be positioned as an interface for some setting change.

The technology of the present disclosure can be applied to communication connection setting for transfer of captured images in various events such as a sport event or the like, for example, in addition to captured images in an event related to marriage.

The program according to the embodiment is a program for causing, for example, a CPU, a DSP, or the like, or a device including the CPU, the DSP, or the like to execute the processing in FIG. 10.

That is, the program according to the embodiment is a program for causing the information processing device 70 to perform processing of an entry mode for detecting a user input for a plurality of setting items provided on a plurality of setting screens in a process of displaying the plurality of setting screens for communication connection setting with the imaging device 2 in a predetermined order, and processing of an advance mode for displaying a corresponding setting screen on the basis of a designation operation for some of the plurality of setting items and detecting a user input for the setting screen.

According to such a program, the staff terminal 1 including the above-described communication setting interface can be implemented in, for example, a mobile terminal device, a personal computer, or other devices capable of executing information processing.

A program for implementing such a staff terminal 1 can be recorded in advance in an HDD as a recording medium built in a device such as a computer device or the like, a ROM in a microcomputer having a CPU, or the like.

Alternatively, the program can be temporarily or permanently stored (recorded) in a removable recording medium such as a flexible disk, a compact disc read only memory (CD-ROM), a magneto optical (MO) disk, a digital versatile disc (DVD), a Blu-ray disc (registered trademark), a magnetic disk, a semiconductor memory, a memory card, or the like. Such a removable recording medium can be provided as so-called package software.

Furthermore, such a program can be installed from a removable recording medium to a personal computer or the like, or can be downloaded from a download site via a network such as a local area network (LAN), the Internet, or the like.

In addition, such a program is suitable for providing the staff terminal 1 of the embodiment in a wide range. For example, by downloading the program to a portable terminal device such as a smartphone, a tablet, or the like, an imaging device, a mobile phone, a personal computer, a still camera, a video camera, a game device, a video device, a personal digital assistant (PDA), or the like, the smartphone or the like can be caused to function as the staff terminal 1 of the present disclosure.

Note that the effects described in the present specification are merely examples and are not limited, and other effects may be provided.

Note that the present technology can also adopt the following configurations.

(1)

An information processing device including
a user interface control unit that performs:
processing of a first connection setting mode of detecting a user input for a plurality of setting items provided on a plurality of setting screens in a process of displaying the plurality of setting screens for communication connection setting with an imaging device in a predetermined order; and
processing of a second connection setting mode of displaying a corresponding setting screen on the basis of a designation operation for some of the plurality of setting items and detecting a user input to the setting screen.

(2)

The information processing device according to (1), further including
a connection setting management unit that performs the communication connection setting in accordance with the user input detected by the user interface control unit in the processing of the first connection setting mode, and updates the communication connection setting in accordance with the user input detected in the processing of the second connection setting mode after the processing of the first connection setting mode.

(3)

The information processing device according to (1) or (2), in which the user interface control unit displays a connection setting start screen on which both a start operation of the first connection setting mode and a designation operation of a setting item in the second connection setting mode are enabled.

(4)

The information processing device according to any one of (1) to (3),
in which in the first connection setting mode, the setting screens related to the plurality of setting items including information processing device-side connection setting and imaging device-side connection setting are sequentially displayed, and
in the second connection setting mode, at least a setting item of the information processing device-side connection setting can be designated.

(5)

The information processing device according to any one of (1) to (4),
in which in the first connection setting mode, the setting screens related to the plurality of setting items including information processing device-side connection setting and imaging device-side connection setting are sequentially displayed, and
in the second connection setting mode, at least a setting item of the imaging device-side connection setting can be designated.

(6)

The information processing device according to any one of (1) to (5),
in which in the first connection setting mode, the setting screens related to the plurality of setting items including information processing device-side connection setting, imaging device-side connection setting, and connection detail setting are sequentially displayed, and in the second connection setting mode, at least a setting item of the connection detail setting can be designated.

(7)

The information processing device according to any one of (1) to (6), in which in the first connection setting mode, the setting screens related to the plurality of setting items including communication connection on/off setting, information processing device-side connection setting, and imaging device-side connection setting are sequentially displayed, and in the second connection setting mode, at least a setting item of the communication connection on/off setting can be designated.

(8)

The information processing device according to any one of (1) to (7), in which in the first connection setting mode, the setting screens related to the plurality of setting items including communication connection on/off setting, information processing device-side connection setting, and imaging device-side connection setting are sequentially displayed, and in the second connection setting mode, in a case where a setting item of the communication connection on/off setting is turned on, the information processing device-side connection setting and the imaging device-side connection setting can be designated.

(9)

The information processing device according to any one of (1) to (8), in which in the first connection setting mode, the setting screens related to the plurality of setting items including information processing device-side connection settings are sequentially displayed, in the second connection setting mode, the information processing device-side connection setting can be designated, and a setting screen for the information processing device-side connection setting in the first connection setting mode and a setting screen for the information processing device-side connection setting in the second connection setting mode are screens indicating setting contents in a same mode.

(10)

The information processing device according to any one of (1) to (9), in which in the first connection setting mode, the setting screens related to the plurality of setting items including imaging device-side connection settings are sequentially displayed, in the second connection setting mode, the imaging device-side connection setting can be designated, and a setting screen for the imaging device-side connection setting in the first connection setting mode and a setting screen for the imaging device-side connection setting in the second connection setting mode are screens indicating setting contents in a same mode.

(11)

The information processing device according to any one of (1) to (10), in which when the communication connection setting in the first connection setting mode is completed, the user interface control unit displays a screen on which an operation for giving an instruction on execution of a test of communication connection can be performed.

(12)

The information processing device according to (3), in which the connection setting start screen is operable to give an instruction on execution of a test of communication connection.

(13)

The information processing device according to (2), further including a communication control unit that controls communication with the imaging device on the basis of the communication connection setting managed by the connection setting management unit, in which the communication control unit causes image transfer from the imaging device to be performed at a time of a test of communication connection, and the user interface control unit performs processing of displaying a transfer image.

(14)

The information processing device according to (13), in which the user interface control unit performs processing of causing a display indicating an error content to be executed in a case where an error occurs in the test of the communication connection.

(15)

The information processing device according to any one of (1) to (14), in which the communication connection setting with the imaging device is communication connection setting of wired communication or short-range wireless communication.

(16)

An information processing method in which an information processing device performs:

processing of a first connection setting mode of detecting a user input for a plurality of setting items provided on a plurality of setting screens in a process of displaying the plurality of setting screens for communication connection setting with an imaging device in a predetermined order; and processing of a second connection setting mode of displaying a corresponding setting screen on the basis of a designation operation for some of the plurality of setting items and detecting a user input to the setting screen.

(17)

A program for causing an information processing device to perform:

processing of a first connection setting mode of detecting a user input for a plurality of setting items provided on a plurality of setting screens in a process of displaying the plurality of setting screens for communication connection setting with an imaging device in a predetermined order; and processing of a second connection setting mode of displaying a corresponding setting screen on the basis of a designation operation for some of the plurality of setting items and detecting a user input to the setting screen.

REFERENCE SIGNS LIST

1 Staff terminal
2 Imaging device
3 Personal computer
4 Server device

5 Client terminal
6 Network
31 UI control unit
32 Communication control unit
33 Connection setting management unit
70 Information processing device
71 CPU
110 Project list screen
120 Event screen
134 Communication icon
140 One-picture display screen
300 Connection setting start screen
301 Entry mode area
302 Connection test area
303 Advance mode area
310 Setup button
311 Test button
320 FTP switch
321 Terminal connection setting operation unit
322 Camera connection setting operation unit
323 Detailed setting operation unit
351 Connection test first screen
352 Connection test second screen
353 Connection test third screen

The invention claimed is:

1. An information processing device comprising:
a memory storing instructions for user interface control, and
at least one processor configured to execute the instructions to perform operations comprising
processing of a first connection setting mode of detecting a user input for a plurality of setting items provided on a plurality of setting screens in a process of displaying the plurality of setting screens for communication connection setting with an imaging device in a predetermined order;
processing of a second connection setting mode of displaying a corresponding setting screen on a basis of a designation operation for some of the plurality of setting items and detecting a user input to the corresponding setting screen; and
displaying a connection setting start screen on which both a start operation of the first connection setting mode and a designation operation of a setting item in the second connection setting mode are enabled.

2. The information processing device according to claim 1, wherein the operations further comprise:
performing communication connection setting in accordance with the detected user input in the processing of the first connection setting mode, and updating the communication connection setting in accordance with the detected user input in the processing of the second connection setting mode after the processing of the first connection setting mode.

3. The information processing device according to claim 1, wherein the connection setting start screen is operable to give an instruction on execution of a test of communication connection.

4. The information processing device according to claim 2, wherein the operations further comprise:
controlling communication with the imaging device on a basis of the communication connection setting;
causing transfer from the imaging device to be performed at a time of a test of communication connection; and
performing of displaying a transfer image.

5. The information processing device according to claim 4, wherein the operations further comprise:
performing processing of causing a display indicating an error content to be executed in a case where an error occurs in the test of the communication connection.

6. The information processing device according to claim 1, wherein the communication connection setting with the imaging device is communication connection setting of wired communication or short-range wireless communication.

7. An information processing device comprising:
a memory storing instructions for user interface control, and
at least one processor configured to execute the instructions to perform operations comprising
processing of a first connection setting mode of detecting a user input for a plurality of setting items provided on a plurality of setting screens in a process of displaying the plurality of setting screens for communication connection setting with an imaging device in a predetermined order; and
processing of a second connection setting mode of displaying a corresponding setting screen on a basis of a designation operation for some of the plurality of setting items and detecting a user input to the corresponding setting screen,
wherein in the first connection setting mode, the setting screens related to the plurality of setting items including information processing device-side connection setting and imaging device-side connection setting are sequentially displayed, and
in the second connection setting mode, at least a setting item of the information processing device-side connection setting can be designated.

8. An information processing device comprising:
a memory storing instructions for user interface control, and
at least one processor configured to execute the instructions to perform operations comprising
processing of a first connection setting mode of detecting a user input for a plurality of setting items provided on a plurality of setting screens in a process of displaying the plurality of setting screens for communication connection setting with an imaging device in a predetermined order; and
processing of a second connection setting mode of displaying a corresponding setting screen on a basis of a designation operation for some of the plurality of setting items and detecting a user input to the corresponding setting screen,
wherein in the first connection setting mode, the setting screens related to the plurality of setting items including information processing device-side connection setting and imaging device-side connection setting are sequentially displayed, and
in the second connection setting mode, at least a setting item of the imaging device-side connection setting can be designated.

9. An information processing device comprising:
a memory storing instructions for user interface control, and
at least one processor configured to execute the instructions to perform operations comprising
processing of a first connection setting mode of detecting a user input for a plurality of setting items provided on a plurality of setting screens in a process of displaying the plurality of setting screens for communication connection setting with an imaging device in a predetermined order; and processing of a second connection setting mode of displaying a corresponding setting screen on a basis of a designation operation for some of the plurality of setting items and detecting a user input to the corresponding setting screen, wherein in the first connection setting mode, the setting screens related to the plurality of setting items including information processing device-side connection setting, imaging device-side connection setting, and connection detail setting are sequentially displayed, and in the second connection setting mode, at least a setting item of the connection detail setting can be designated.

10. An information processing device comprising:
a memory storing instructions for user interface control, and
at least one processor configured to execute the instructions to perform operations comprising
processing of a first connection setting mode of detecting a user input for a plurality of setting items provided on a plurality of setting screens in a process of displaying the plurality of setting screens for communication connection setting with an imaging device in a predetermined order; and
processing of a second connection setting mode of displaying a corresponding setting screen on a basis of a designation operation for some of the plurality of setting items and detecting a user input to the corresponding setting screen,
wherein in the first connection setting mode, the setting screens related to the plurality of setting items including communication connection on/off setting, information processing device-side connection setting, and imaging device-side connection setting are sequentially displayed, and
in the second connection setting mode, at least a setting item of the communication connection on/off setting can be designated.

11. An information processing device comprising:
a memory storing instructions for user interface control, and
at least one processor configured to execute the instructions to perform operations comprising
processing of a first connection setting mode of detecting a user input for a plurality of setting items provided on a plurality of setting screens in a process of displaying the plurality of setting screens for communication connection setting with an imaging device in a predetermined order; and
processing of a second connection setting mode of displaying a corresponding setting screen on a basis of a designation operation for some of the plurality of setting items and detecting a user input to the corresponding setting screen,
wherein in the first connection setting mode, the setting screens related to the plurality of setting items including communication connection on/off setting, information processing device-side connection setting, and imaging device-side connection setting are sequentially displayed, and
in the second connection setting mode, in a case where a setting item of the communication connection on/off setting is turned on, the information processing device-side connection setting and the imaging device-side connection setting can be designated.

12. An information processing device comprising:
a memory storing instructions for user interface control, and
at least one processor configured to execute the instructions to perform operations comprising
processing of a first connection setting mode of detecting a user input for a plurality of setting items provided on a plurality of setting screens in a process of displaying the plurality of setting screens for communication connection setting with an imaging device in a predetermined order; and
processing of a second connection setting mode of displaying a corresponding setting screen on a basis of a designation operation for some of the plurality of setting items and detecting a user input to the corresponding setting screen,
wherein in the first connection setting mode, the setting screens related to the plurality of setting items including information processing device-side connection settings are sequentially displayed,
in the second connection setting mode, the information processing device-side connection setting can be designated, and
a setting screen for the information processing device-side connection setting in the first connection setting mode and a setting screen for the information processing device-side connection setting in the second connection setting mode are screens indicating setting contents in a same mode.

13. An information processing device comprising:
a memory storing instructions for user interface control, and
at least one processor configured to execute the instructions to perform operations comprising
processing of a first connection setting mode of detecting a user input for a plurality of setting items provided on a plurality of setting screens in a process of displaying the plurality of setting screens for communication connection setting with an imaging device in a predetermined order; and
processing of a second connection setting mode of displaying a corresponding setting screen on a basis of a designation operation for some of the plurality of setting items and detecting a user input to the corresponding setting screen,
wherein in the first connection setting mode, the setting screens related to the plurality of setting items including imaging device-side connection settings are sequentially displayed,
in the second connection setting mode, the imaging device-side connection setting can be designated, and
a setting screen for the imaging device-side connection setting in the first connection setting mode and a setting screen for the imaging device-side connection setting in the second connection setting mode are screens indicating setting contents in a same mode.

14. An information processing device comprising:
a memory storing instructions for user interface control, and
at least one processor configured to execute the instructions to perform operations comprising
processing of a first connection setting mode of detecting a user input for a plurality of setting items provided on a plurality of setting screens in a process of displaying the plurality of setting screens for communication connection setting with an imaging device in a predetermined order;

processing of a second connection setting mode of displaying a corresponding setting screen on a basis of a designation operation for some of the plurality of setting items and detecting a user input to the corresponding setting screen; and when the communication connection setting in the first connection setting mode is completed, displaying a screen on which an operation for giving an instruction on execution of a test of communication connection can be performed.

15. A non-transitory computer readable medium storing a program for controlling an information processing device, the program being executable by a processor to perform operations comprising:

processing of a first connection setting mode of detecting a user input for a plurality of setting items provided on a plurality of setting screens in a process of displaying the plurality of setting screens for communication connection setting with an imaging device in a predetermined order;

processing of a second connection setting mode of displaying a corresponding setting screen on a basis of a designation operation for some of the plurality of setting items and detecting a user input to the corresponding setting screen; and displaying a connection setting start screen on which both a start operation of the first connection setting mode and a designation operation of a setting item in the second connection setting mode are enabled.

16. A non-transitory computer readable medium storing a program for controlling an information processing device, the program being executable by a processor to perform operations comprising:

processing of a first connection setting mode of detecting a user input for a plurality of setting items provided on a plurality of setting screens in a process of displaying the plurality of setting screens for communication connection setting with an imaging device in a predetermined order; and processing of a second connection setting mode of displaying a corresponding setting screen on a basis of a designation operation for some of the plurality of setting items and detecting a user input to the corresponding setting screen, wherein in the first connection setting mode, the setting screens related to the plurality of setting items including information processing device-side connection setting, imaging device-side connection setting, and connection detail setting are sequentially displayed, and in the second connection setting mode, at least a setting item of the connection detail setting can be designated.

* * * * *